US012703400B2

(12) United States Patent
Sanchez

(10) Patent No.: US 12,703,400 B2
(45) Date of Patent: Aug. 11, 2026

(54) SMART RING SYSTEM FOR MEASURING STRESS LEVELS AND USING MACHINE LEARNING TECHNIQUES TO PREDICT HIGH RISK DRIVING BEHAVIOR

(71) Applicant: QUANATA, LLC, San Francisco, CA (US)

(72) Inventor: Kenneth Jason Sanchez, San Francisco, CA (US)

(73) Assignee: QUANATA, LLC, San Francisco, CA (US)

( * ) Notice: Subject to any disclaimer, the term of this patent is extended or adjusted under 35 U.S.C. 154(b) by 60 days.

(21) Appl. No.: 16/925,814

(22) Filed: Jul. 10, 2020

(65) Prior Publication Data

US 2023/0174114 A1 Jun. 8, 2023

Related U.S. Application Data

(60) Provisional application No. 62/988,060, filed on Mar. 11, 2020, provisional application No. 62/877,391, filed on Jul. 23, 2019.

(51) Int. Cl.
*B60W 40/08* (2012.01)
*B60W 50/14* (2020.01)
(Continued)

(52) U.S. Cl.
CPC ........ *B60W 60/0059* (2020.02); *B60W 40/08* (2013.01); *B60W 50/14* (2013.01);
(Continued)

(58) Field of Classification Search
CPC ......... B60W 60/0059; B60W 60/0051; B60W 40/08; B60W 50/14; B60W 2540/221;
(Continued)

(56) References Cited

U.S. PATENT DOCUMENTS 513,344 A 1/1894 Smith
2,737,192 A 3/1956 Bieler
(Continued)

FOREIGN PATENT DOCUMENTS

AU 2014218612 A1 8/2015
AU 2017324615 A1 2/2019
(Continued)

OTHER PUBLICATIONS

Mario, https://www.smartringnews.com/posts/smart-ring-vs-smartwatch-which-is-the-best-fitness-and-activity-tracker (Year: 2014).*
(Continued)

*Primary Examiner* — Jelani A Smith
*Assistant Examiner* — Gabriel Anfinrud
(74) *Attorney, Agent, or Firm* — BRYAN CAVE LEIGHTON PAISNER LLP

(57) ABSTRACT

The described systems and methods determine a driver's fitness to safely operate a moving vehicle based at least in part upon observed stress patterns. A smart ring, wearable on a user's finger, continuously monitors user's physiological and behavioral parameters indicative of being under stress. This stress data, representing stress patterns, can be utilized, in combination with driving data, to train a machine learning model, which will predict the user's level of risk exposure based at least in part upon observed stress patterns. The user can be warned of this risk to prevent them from driving or to encourage them to use an appropriate stress coping strategy before or during driving. In some instances, the disclosed smart ring system may interact with the user's vehicle to prevent it from starting while exposed to high risk due to deteriorated psychological or physiological conditions stemming from being under stress.

20 Claims, 8 Drawing Sheets

(51) Int. Cl.
*B60W 60/00* (2020.01)
*G01L 5/22* (2006.01)
*G06N 20/00* (2019.01)

(52) U.S. Cl.
CPC ......... *B60W 60/0051* (2020.02); *G01L 5/221* (2013.01); *G06N 20/00* (2019.01); *B60W 2050/146* (2013.01); *B60W 2540/22* (2013.01); *B60W 2540/221* (2020.02); *B60W 2540/30* (2013.01)

(58) Field of Classification Search
CPC ....... B60W 2050/146; B60W 2540/22; B60W 2540/30; G06N 20/00; G01L 5/221
See application file for complete search history.

(56) References Cited

U.S. PATENT DOCUMENTS 3,792,192 A 2/1974 Plate
4,012,629 A 3/1977 Simms
4,382,112 A 5/1983 Betts et al.
4,684,687 A 8/1987 Breach et al.
4,830,014 A 5/1989 Goodman et al.
4,880,304 A 11/1989 Jaeb et al.
5,135,220 A 8/1992 Baldoni
6,097,480 A * 8/2000 Kaplan ................ B60K 28/063 356/139
6,154,658 A 11/2000 Caci
6,201,698 B1 3/2001 Hunter
6,560,993 B1 5/2003 Bosque et al.
6,608,562 B1 8/2003 Kimura et al.
6,699,199 B2 3/2004 Asada et al.
6,745,061 B1 6/2004 Hicks et al.
6,792,044 B2 9/2004 Peng et al.
6,800,693 B2 10/2004 Nishihara et al.
6,803,391 B2 10/2004 Paglia et al.
6,805,140 B2 10/2004 Velez, Jr. et al.
6,894,628 B2 5/2005 Marpe et al.
6,909,753 B2 6/2005 Meehan et al.
6,959,116 B2 10/2005 Sezer et al.
7,013,674 B2 3/2006 Kretchmer
7,136,532 B2 11/2006 VanDer
7,190,986 B1 3/2007 Hannula et al.
7,227,894 B2 6/2007 Lin et al.
7,275,172 B2 9/2007 Janzen
7,286,710 B2 10/2007 Marpe et al.
7,468,036 B1 12/2008 Rulkov et al.
7,500,697 B2 3/2009 Romack
7,500,746 B1 3/2009 Howell et al.
7,519,229 B2 4/2009 Wallace et al.
7,689,437 B1 3/2010 Teller et al.
7,872,444 B2 1/2011 Hamilton et al.
8,031,172 B2 10/2011 Kruse et al.
8,075,484 B2 12/2011 Moore-Ede
8,345,752 B2 1/2013 Lee et al.
8,446,275 B2 5/2013 Utter, II
8,554,297 B2 10/2013 Moon et al.
8,570,273 B1 10/2013 Smith
8,624,554 B2 1/2014 Ajagbe
8,700,111 B2 4/2014 Leboeuf et al.
8,954,135 B2 2/2015 Yuen et al.
9,218,058 B2 12/2015 Bress et al.
9,248,839 B1 2/2016 Tan
9,248,938 B2 2/2016 Hopps
9,265,310 B2 2/2016 Lam
9,362,775 B1 6/2016 Jacobs
9,420,260 B2 8/2016 Mcgregor et al.
9,440,657 B1 9/2016 Fields et al.
9,477,146 B2 10/2016 Xu et al.
9,509,170 B2 11/2016 Wu
9,628,707 B2 4/2017 Blum et al.
9,660,488 B2 5/2017 Breedvelt-Schouten et al.
9,696,690 B2 7/2017 Nguyen et al.
9,711,060 B1 7/2017 Lusted et al.
9,711,993 B2 7/2017 Kim
9,717,949 B1 8/2017 Tran et al.
9,733,700 B2 8/2017 Song et al.
9,756,301 B2 9/2017 Li et al.
9,798,458 B2 10/2017 Dumont et al.
9,841,331 B2 12/2017 Wood et al.
9,847,020 B2 12/2017 Davis
9,861,314 B2 1/2018 Haverinen et al.
9,880,620 B2 1/2018 Kienzle et al.
9,908,530 B1 * 3/2018 Fields ................. B60K 28/066
9,931,976 B1 4/2018 Terwilliger et al.
9,955,286 B2 4/2018 Segal
9,956,963 B2 5/2018 Kumar et al.
9,965,761 B2 5/2018 Elangovan et al.
10,007,355 B2 6/2018 Schorsch et al.
10,043,125 B2 8/2018 Park
10,085,695 B2 10/2018 Ouwerkerk et al.
10,099,608 B2 10/2018 Cuddihy et al.
10,102,510 B2 10/2018 Yau et al.
10,137,777 B2 11/2018 Lu et al.
10,139,859 B2 11/2018 Von Badinski et al.
10,192,171 B2 1/2019 Taylor
10,281,953 B2 5/2019 Von Badinski
10,303,867 B2 5/2019 Schröder
10,315,557 B2 6/2019 Terwilliger et al.
10,317,940 B2 6/2019 Eim et al.
10,345,506 B1 7/2019 Lyu
10,359,846 B2 7/2019 Priyantha et al.
10,366,220 B2 7/2019 Shapiro et al.
10,377,386 B2 * 8/2019 Richmond ............... B60N 2/56
10,384,647 B2 8/2019 Tayama
10,396,584 B2 8/2019 Madau et al.
10,409,327 B2 9/2019 Stotler
10,444,834 B2 10/2019 Vescovi et al.
10,463,141 B2 11/2019 Fitzgerald et al.
10,509,994 B1 12/2019 Huynh
10,528,989 B1 1/2020 Irey
10,564,628 B2 2/2020 Hargovan et al.
10,629,175 B2 4/2020 Yan et al.
10,664,842 B1 5/2020 Bermudez et al.
10,679,296 B1 6/2020 Devereaux et al.
10,681,818 B1 6/2020 Graber et al.
10,693,872 B1 6/2020 Larson et al.
10,701,067 B1 6/2020 Ziraknejad
10,703,204 B2 7/2020 Hassan et al.
10,709,339 B1 7/2020 Lusted
10,713,726 B1 7/2020 Allen et al.
10,745,032 B2 8/2020 Scheggi
10,762,183 B1 9/2020 Charan et al.
10,768,666 B2 9/2020 Von Badinski et al.
10,838,499 B2 11/2020 Wang
10,842,429 B2 11/2020 Kinnunen et al.
10,849,557 B2 12/2020 Keating
10,893,833 B2 1/2021 Haverinen et al.
10,944,745 B2 3/2021 Kursun
11,056,242 B1 7/2021 Jain et al.
11,127,506 B1 9/2021 Jain et al.
11,227,060 B1 1/2022 John et al.
11,237,640 B2 2/2022 Zhu et al.
11,265,635 B2 3/2022 Shankar
11,271,290 B2 3/2022 McLear et al.
11,312,299 B1 4/2022 Assam
11,342,051 B1 5/2022 Jain et al.
11,456,080 B1 9/2022 Jain et al.
11,479,258 B1 10/2022 Sanchez
11,504,011 B1 11/2022 Jain et al.
11,599,147 B2 3/2023 Von Badinski et al.
11,601,424 B2 3/2023 Fukuda
11,637,511 B2 4/2023 Sanchez
11,714,494 B2 8/2023 D'Amone et al.
11,868,178 B2 1/2024 Von Badinski et al.
11,868,179 B2 1/2024 Von Badinski et al.
11,894,704 B2 2/2024 Sanchez
11,909,238 B1 2/2024 Sanchez
11,914,780 B2 2/2024 Wang et al.
11,923,791 B2 3/2024 Sanchez
11,984,742 B2 5/2024 Sanchez
11,990,954 B2 5/2024 Kato et al.
12,077,193 B1 9/2024 Sanchez
12,191,692 B2 1/2025 Sanchez

(56) References Cited

U.S. PATENT DOCUMENTS 12,211,467 B2 1/2025 Sanchez
12,237,700 B2 2/2025 Sanchez et al.
12,441,332 B2 10/2025 Sanchez
12,479,445 B2 11/2025 Sanchez et al.
12,500,429 B2 12/2025 Sanchez et al.
2002/0042464 A1 4/2002 Barclay et al.
2002/0091568 A1 7/2002 Kraft et al.
2002/0121831 A1 9/2002 Egawa et al.
2003/0077064 A1 4/2003 Katayama
2003/0142065 A1 7/2003 Pahlavan
2004/0090210 A1 5/2004 Becker et al.
2004/0102551 A1 5/2004 Sato et al.
2004/0118592 A1 6/2004 Pehlert
2004/0145256 A1 7/2004 Miekka
2004/0160635 A1 8/2004 Ikeda et al.
2004/0200235 A1 10/2004 Kretchmer
2005/0012648 A1 1/2005 Marpe et al.
2005/0030205 A1 2/2005 Konoshima et al.
2005/0054941 A1 3/2005 Ting et al.
2005/0062454 A1 3/2005 Raghunath et al.
2005/0133248 A1 6/2005 Easter
2005/0162523 A1 7/2005 Darrell et al.
2005/0185060 A1 8/2005 Neven, Sr.
2005/0185843 A1 8/2005 Kudoh
2005/0185844 A1 8/2005 Ono et al.
2005/0230596 A1 10/2005 Howell et al.
2006/0002607 A1 1/2006 Boncyk et al.
2006/0069681 A1 3/2006 Lauper
2006/0080286 A1 4/2006 Svendsen
2006/0085477 A1 4/2006 Phillips et al.
2006/0089792 A1 4/2006 Manber et al.
2006/0211924 A1 9/2006 Dalke et al.
2006/0250043 A1 11/2006 Chung
2006/0271593 A1 11/2006 De Mes et al.
2007/0149222 A1 6/2007 Hodko et al.
2007/0159522 A1 7/2007 Neven
2007/0188626 A1 8/2007 Squilla et al.
2007/0200713 A1 8/2007 Weber et al.
2007/0223826 A1 9/2007 Ridge et al.
2008/0068559 A1 3/2008 Howell et al.
2008/0136587 A1 6/2008 Orr
2008/0174676 A1 7/2008 Squilla et al.
2008/0218684 A1 9/2008 Howell et al.
2008/0275309 A1 11/2008 Stivoric et al.
2009/0056703 A1 3/2009 Mills et al.
2010/0219989 A1 9/2010 Asami et al.
2011/0007035 A1 1/2011 Shai
2011/0080339 A1 4/2011 Sun et al.
2011/0224875 A1* 9/2011 Cuddihy ............... B60W 10/18
701/1
2012/0016245 A1 1/2012 Niwa et al.
2012/0075196 A1 3/2012 Ashbrook et al.
2012/0130203 A1 5/2012 Stergiou et al.
2012/0184367 A1 7/2012 Parrott et al.
2012/0218184 A1 8/2012 Wissmar
2012/0293107 A1 11/2012 Ajagbe
2012/0317024 A1 12/2012 Rahman et al.
2013/0106603 A1 5/2013 Weast et al.
2013/0211291 A1 8/2013 Tran
2013/0335213 A1 12/2013 Sherony et al.
2014/0091659 A1 4/2014 Suzuki et al.
2014/0107493 A1 4/2014 Yuen et al.
2014/0118704 A1 5/2014 Duelli et al.
2014/0120983 A1 5/2014 Lam
2014/0187160 A1 7/2014 Prencipe
2014/0218529 A1 8/2014 Mahmoud et al.
2014/0238153 A1 8/2014 Wood et al.
2014/0240132 A1 8/2014 Bychkov
2014/0244009 A1 8/2014 Mestas
2014/0267024 A1 9/2014 Keller et al.
2014/0274203 A1 9/2014 Ganong, III
2014/0309849 A1 10/2014 Ricci
2014/0361934 A1 12/2014 Ely et al.
2014/0361945 A1 12/2014 Misra et al.
2015/0003693 A1 1/2015 Baca et al.
2015/0019266 A1 1/2015 Stempora
2015/0028996 A1 1/2015 Agrafioti
2015/0029089 A1 1/2015 Kim
2015/0046996 A1 2/2015 Slaby et al.
2015/0062086 A1 3/2015 Nattukallingal
2015/0065090 A1* 3/2015 Yeh ....................... H04W 12/06
455/563
2015/0098309 A1 4/2015 Adams
2015/0124096 A1 5/2015 Koravadi
2015/0126824 A1 5/2015 Leboeuf et al.
2015/0133193 A1 5/2015 Stotler
2015/0158499 A1 6/2015 Koravadi
2015/0186092 A1 7/2015 Francis et al.
2015/0220109 A1 8/2015 Von et al.
2015/0277559 A1 10/2015 Vescovi et al.
2015/0287412 A1 10/2015 Tang
2015/0338926 A1 11/2015 Park et al.
2015/0352953 A1 12/2015 Koravadi
2016/0028267 A1 1/2016 Lee et al.
2016/0098530 A1 4/2016 Dill et al.
2016/0189149 A1 6/2016 MacLaurin et al.
2016/0192407 A1 6/2016 Fyfe et al.
2016/0207454 A1 7/2016 Cuddihy et al.
2016/0226313 A1 8/2016 Okubo
2016/0236692 A1 8/2016 Kleen et al.
2016/0266606 A1 9/2016 Ricci
2016/0292563 A1 10/2016 Park
2016/0317060 A1 11/2016 Connor
2016/0334901 A1 11/2016 Rihn
2016/0336758 A1 11/2016 Breedvelt-Schouten et al.
2016/0350581 A1 12/2016 Manel et al.
2016/0361032 A1 12/2016 Carter et al.
2017/0010677 A1 1/2017 Roh et al.
2017/0012925 A1 1/2017 Tekin et al.
2017/0024008 A1 1/2017 Kienzle et al.
2017/0026790 A1* 1/2017 Flitsch ................. A61B 5/0022
2017/0042477 A1 2/2017 Haverinen et al.
2017/0053461 A1 2/2017 Pal
2017/0057492 A1 3/2017 Edgington et al.
2017/0070078 A1 3/2017 Hwang et al.
2017/0075701 A1 3/2017 Ricci et al.
2017/0080952 A1 3/2017 Gupta et al.
2017/0090475 A1 3/2017 Choi et al.
2017/0109512 A1 4/2017 Bower et al.
2017/0129335 A1 5/2017 Lu et al.
2017/0131772 A1 5/2017 Choi
2017/0150255 A1 5/2017 Wang et al.
2017/0190121 A1 7/2017 Aggarwal et al.
2017/0192530 A1 7/2017 Lee
2017/0242428 A1 8/2017 Pal et al.
2017/0251967 A1* 9/2017 Premsukh ............ A61B 5/0004
2017/0336964 A1 11/2017 Kim
2017/0346635 A1 11/2017 Gummeson et al.
2017/0347895 A1 12/2017 Wei et al.
2017/0355377 A1 12/2017 Vijaya Kumar et al.
2017/0374074 A1 12/2017 Stuntebeck
2018/0025351 A1 1/2018 Chen et al.
2018/0025430 A1 1/2018 Perl et al.
2018/0032126 A1 2/2018 Liu
2018/0037228 A1 2/2018 Biondo et al.
2018/0039303 A1 2/2018 Hashimoto et al.
2018/0052428 A1 2/2018 Abramov
2018/0054513 A1 2/2018 Ma
2018/0068105 A1 3/2018 Shapiro et al.
2018/0093606 A1 4/2018 Terwilliger et al.
2018/0093610 A1 4/2018 Sun et al.
2018/0093672 A1 4/2018 Terwilliger et al.
2018/0115797 A1 4/2018 Wexler et al.
2018/0120891 A1 5/2018 Eim
2018/0120892 A1 5/2018 Von et al.
2018/0123629 A1 5/2018 Wetzig
2018/0167200 A1 6/2018 High et al.
2018/0174457 A1* 6/2018 Taylor .................. G08G 1/0962
2018/0178712 A1 6/2018 Terwilliger et al.
2018/0229674 A1* 8/2018 Heinrich .................. A61B 5/18
2018/0256027 A1 9/2018 Lacher
2018/0257668 A1 9/2018 Tonshal
2018/0262505 A1 9/2018 Ligatti
2018/0292901 A1 10/2018 Priyantha et al.

(56) References Cited

U.S. PATENT DOCUMENTS

| | | | | |
|---|---|---|---|---|
| 2018/0300467 | A1 | 10/2018 | Kwong et al. | |
| 2018/0322957 | A1 | 11/2018 | Dill et al. | |
| 2019/0004325 | A1 | 1/2019 | Connor | |
| 2019/0049267 | A1 | 2/2019 | Huang | |
| 2019/0083022 | A1 | 3/2019 | Huang | |
| 2019/0131812 | A1 | 5/2019 | Lee et al. | |
| 2019/0155104 | A1 | 5/2019 | Li et al. | |
| 2019/0155385 | A1 | 5/2019 | Lim et al. | |
| 2019/0172289 | A1 | 6/2019 | O'Toole et al. | |
| 2019/0191998 | A1 | 6/2019 | Heikenfeld et al. | |
| 2019/0213429 | A1 | 7/2019 | Sicconi et al. | |
| 2019/0230507 | A1 | 7/2019 | Li et al. | |
| 2019/0265868 | A1 | 8/2019 | Penilla et al. | |
| 2019/0286805 | A1 | 9/2019 | Law et al. | |
| 2019/0287083 | A1 | 9/2019 | Wurmfeld et al. | |
| 2019/0295440 | A1* | 9/2019 | Hadad | G06F 40/295 |
| 2019/0298173 | A1 | 10/2019 | Lawrence et al. | |
| 2019/0298265 | A1 | 10/2019 | Keating | |
| 2019/0313967 | A1 | 10/2019 | Lee | |
| 2019/0332140 | A1 | 10/2019 | Wang et al. | |
| 2019/0332787 | A1 | 10/2019 | Graf et al. | |
| 2019/0342329 | A1 | 11/2019 | Turgeman | |
| 2019/0357834 | A1 | 11/2019 | Aarts et al. | |
| 2020/0001895 | A1 | 1/2020 | Scheggi | |
| 2020/0005791 | A1 | 1/2020 | Rakshit et al. | |
| 2020/0062276 | A1 | 2/2020 | Yuan et al. | |
| 2020/0070840 | A1 | 3/2020 | Gunaratne | |
| 2020/0142497 | A1 | 5/2020 | Zhu | |
| 2020/0159896 | A1 | 5/2020 | Shapiro et al. | |
| 2020/0218238 | A1 | 7/2020 | Wang | |
| 2020/0356652 | A1 | 11/2020 | Yamaguchi et al. | |
| 2020/0391696 | A1 | 12/2020 | Kato et al. | |
| 2021/0019731 | A1 | 1/2021 | Rule et al. | |
| 2021/0029112 | A1 | 1/2021 | Palle et al. | |
| 2021/0058692 | A1 | 2/2021 | Shankar | |
| 2021/0197849 | A1 | 7/2021 | Tsuji | |
| 2021/0210982 | A1 | 7/2021 | Wallace et al. | |
| 2021/0382684 | A1 | 12/2021 | Hachiya et al. | |
| 2022/0083149 | A1 | 3/2022 | Keller et al. | |
| 2022/0233142 | A1 | 7/2022 | Hasan et al. | |
| 2023/0225671 | A1 | 7/2023 | Kosman et al. | |

FOREIGN PATENT DOCUMENTS

| | | | |
|---|---|---|---|
| CN | 103109462 | A | 5/2013 |
| CN | 104799509 | A | 7/2015 |
| CN | 105841851 | A | 8/2016 |
| CN | 105960196 | | 9/2016 |
| CN | 106360895 | A | 2/2017 |
| CN | 206213423 | U | 6/2017 |
| CN | 206333477 | U | 7/2017 |
| CN | 206371611 | U | 8/2017 |
| CN | 107139933 | A | 9/2017 |
| CN | 107260139 | A | 10/2017 |
| CN | 104157116 | A | 12/2017 |
| CN | 105006103 | B | 4/2018 |
| CN | 108900691 | A | 11/2018 |
| CN | 108926081 | A | 12/2018 |
| CN | 114074599 | A | 2/2022 |
| DE | 10201301233399 | | 7/2013 |
| DE | 102015006677 | A1 | 11/2016 |
| DE | 102019116618 | A1 | 12/2020 |
| EP | 1223191 | A1 | 7/2002 |
| EP | 1384752 | A1 | 1/2004 |
| EP | 2281205 | A1 | 2/2011 |
| EP | 2375540 | A2 | 10/2011 |
| EP | 2581856 | A1 | 4/2013 |
| JP | 200879676 | | 4/2008 |
| KR | 20110012229 | | 2/2011 |
| KR | 20170013067 | | 2/2017 |
| KR | 10-2017-0087113 | A | 7/2017 |
| KR | 101835991 | B1 | 4/2018 |
| WO | 2001017421 | | 3/2001 |
| WO | 2005114476 | A1 | 12/2005 |
| WO | 2005124594 | A1 | 12/2005 |
| WO | 2008008714 | A1 | 1/2008 |
| WO | 2011132009 | A2 | 4/2011 |
| WO | 2015/077418 | A1 | 5/2015 |
| WO | 2017/136940 | A1 | 8/2017 |
| WO | 2018/000396 | A1 | 1/2018 |
| WO | 2018048563 | A1 | 3/2018 |
| WO | 2018/154341 | A1 | 8/2018 |
| WO | 2018164632 | | 9/2018 |
| WO | 2018/204811 | A1 | 11/2018 |
| WO | 2019/082095 | A1 | 5/2019 |
| WO | 2019/140528 | A1 | 7/2019 |
| WO | 2019/180626 | A1 | 9/2019 |

OTHER PUBLICATIONS https://en.wikipedia.org/w/index.php?title=Ring_size&oldid=891328817 (Year: 2019).*

Adafruit, p. 1-2, available at: https://www.adafruit.com/product/2806, published Jun. 2019 (Year: 2019).

Laput et al., "Skin buttons: cheap, small, low-powered and clickable fixed-icon laser projectors", UIST '14: Proceedings of the 27th annual ACM symposium on User interface software and technology, Oct. 2014 pp. 389-394.

"How to find your ideal bedtime with the Oura app", available online at <https://web.archive.org/web/20191206205332/https://ouraring.com/how-to-find-your-ideal-bedtime-with-the-oura-app/>, 2019, 8 pages.

"Vauxhall/Opel In-Car Wireless Charging", retrieved from <https://www.air-charge.com/aircharge-for-business/automotive/vauxhall-wireless- charging>, Oct. 2019, 4 pages.

"Wireless charging for smart ring/pointing devices" available online at <http://www.humavox.com/smt_product/wireless-charging-for-smart-ringpointing-devices/>, Oct. 2019, 3 pages.

ASU projection wearable: Live tomorrow today (world first launch @ CES 2016). (Dec. 2015). ASU Tech, YouTube. Retrieved from https://www.youtube.com/watch?v=Wdb5O-D7Y0Y.

Brownell, L., "Low-cost wearables manufactured by hybrid 3D printing. Wyss Institute, Harvard," Retrieved from https://wyss.harvard.edu/news/low-cost-wearables-manufactured-by-hybrid-3d-printing/, Sep. 6, 2017, pp. 11.

Cetin, C., "Design, testing and implementation of a new authentication method using multiple devices," Graduate Theses and Dissertations, University of South Florida Scholar Commons. Retrieved from http://scholarcommons.usf.edu/etd/5660, Jan. 2015, pp. 61.

Charles Q. Choi, "Low Battery? New Tech Lets You Wirelessly Share Power", available online at <https://www.livescience.com/54790-new-tech-enables-wireless-charging.html>, May 19, 2016, 9 pages.

Chen, X. A., et al., "Encore: 3D printed augmentation of everyday objects with printed-over, affixed and interlocked attachments," Nov. 5, 2015, pp. 73-82.

Chen, X. A., et al., "Reprise: A design tool for specifying, generating, and customizing 3D printable adaptations on everyday objects," Oct. 16, 2016, pp. 29-39.

E-Senses, "Personal vitamin D, sunlight and daylight coach", available online at <https://e-senses.com/>, 2019, 5 pages.

Hipolite, W., "The 3D printed Ö Bluetooth Ring is one of the tiniest personal computers you will ever see," 3DPrint.com. Retrieved from https://3dprint.com/34627/o-bluetooth-ring-3d-printed/, Jan. 2015, pp. 5.

Hussain Almossawi, "This smart ring aims to provide better lives for people with sickle cell disease", retrieved from <https://www.core77.com/projects/82131/This-Smart-Ring-Aims-to-Provide-Better-Lives-for-People-with-Sickle-Cell-Disease>, 2021, 9 pages.

Je et al., "PokeRing: Notifications by poking around the finger", Proceedings of the 2018 CHI Conference on Human Factors in Computing Systems—CHI'18, 2018, paper 542, pp. 1-10.

Katharine Schwab, "Orii, the ring that turns your finger into a phone, is here", available online at <https://www.fastcompany.com/90399237/orii-the-ring-that-turns-your-finger-into-a-phone-is-here >, 2019, 4 pages.

Magno et al., "Self-sustainable smart ring for long-term monitoring of blood oxygenation", IEEE Access, 2019, pp. 115400-115408.

(56) References Cited

OTHER PUBLICATIONS

Mahmud et al., "Wearable technology for drug abuse detection: A survey of recent advancements", Smart Health, vol. 13, Aug. 2019, 100062.
Margaret, "The Orb: A Bluetooth headset that turns into a ring", Gadgets, BornRich, Jun. 2013, available online at <http://www.bornrich.com/the-orb-a-bluetooth-headset-that-turns-into-a-ring.html >.
Nassi et al., "Virtual breathalyzer", Department of Software and Information Systems Engineering, Ben-Gurion University of the Negev, Israel, 2016, 10 pages.
Neev Kiran, "SkinnySensor: Enabling Battery-Less Wearable Sensors Via Intrabody Power Transfer", Masters Theses 694, University of Massachusetts Amherst, 2018, 63 pages.
Nerd-Fu, "Push present", Delicious Juice Dot Com, Apr. 2015, available online at <https://blog.deliciousjuice.com/2015/04/ >.
Pablo E Suárez, "NXT Ring—Your Digital-self at Hand", available online at <https://www.youtube.com/watch?v=9w7uxDHs7NY>, uploaded on Jun. 21, 2019, 2 pages.
Roumen et al., "NotiRing: A comparative study of notification channels for wearable interactive rings", Proceedings of the 33rd Annual ACM Conference on Human Factors in Computing Systems—CHI'15, 2015, pp. 2497-2500.
Sarah Jacobsson Purewal, "Ringly review: The smart ring that could be sexier", available online at <https://www.macworld.com/article/227133/ringly-review-the-smart-ring-that-could-be-sexier.html>, 2016, 10 pages.
Schwab, K., "This startup wants to kill passwords—and replace them with jewelry. Fast Company," Retrieved from https://www.fastcompany.com/90254843/this-startup-wants-to-kill-passwords-and-replace-them-with-jewelry, (Oct. 2018), pp. 7.
Seung et al., "Nanopatterned Textile-Based Wearable Triboelectric Nanogenerator", ACS Nano, vol. 9, 2015, pp. 3501-3509.
Shane McGlaun, "Geek builds Bluetooth Smart Ring with OLED display", available online at <https://www.slashgear.com/geek-builds-bluetooth-smart-ring-with-oled-display-02361383/>, 2015, 6 pages.
Sperlazza, "We tested four sleep tracker apps and wearables: Here are the best ones", available online at <https://www.bulletproof.com/sleep/tech/best-sleep-tracker-apps/>, 2019, 18 pages.
Turunen, "Smart ring for stress control and self-understanding", available online at <https://slowfinland.fi/en/smart-ring-for-stress-control-and-self-understanding/>, 2017, 9 pages.
Wochit Tech. (2017). New smart ring monitors UV exposure [Video file]. Retrieved from https://www.youtube.com/watch?v=4YvkioTZxjU, 3 pages.
Worgan et al., "Garment level power distribution for wearables using inductive power transfer", 9th International Conference on Human System Interactions (HSI), 2016, pp. 277-283.
Xiao et al., "LumiWatch: On-arm projected graphics and touch input", Proceedings of the 2018 CHI Conference on Human Factors in Computing Systems—CHI'18, 2018, pp. 1-11.
Zhu et al., "Developing a driving fatigue detection system using physiological sensors", Proceedings of the 29th Australian Conference on Computer-Human Interaction—OZCHI '17, 2017, pp. 566-570.
Zhu, M. et al. "Fluidic fabric muscle sheets for wearable and soft robotics," Retrieved from https://arxiv.org/pdf/1903.08253.pdf, Mar. 2019, pp. 32.
Google translation of KR20170087113A (Year: 2016).
Adafruit.com, "RFID/NFC Smart Ring—Size 12—NTAG213", Accessed at: https://web.archive.org/web/20190605061438/https://www.adafruit.com/product/2806, publication Jun. 5, 2019 (Year: 2019).
"The Oura App | Oura Ring", available online at <https://web.archive.org/web/20191019192921/https://ouraring.com/introducing-the-new-oura-app/>, 6 pages Oct. 29, 2019.
"Get the Technical Specs of Oura Ring | Oura Ring", available online at <https://web.archive.org/web/20191290144439/https://ouraring.com/tech-specs/>, 3 pages Jan. 29, 2019.
"Learn how the Oura ring works | Go inside | Oura Ring", available online at <https://web.archive.org/web/20181127193557/https://ouraring.com/how-oura-works/>, 5 pages Nov. 27, 2018.
Oura Ring Generation 1 User Manual, available online at < https://fccid.io/2AD7V-OURARING15001/User-Manual/User-Manual-2844448.pdf>, 8 pages Nov. 24, 2015.
Oura Ring Generation 2 User Manual, available online at < https://fccid.io/2AD7V-OURA1801/User-Manual/User-manual-v2-3856414.pdf>, 13 pages Mar. 27, 2018.
Oura ring. Improve sleep. Perform better. by OURA—Kickstarter, available online at <https://web.archive.org/web/20160427015852/https://www.kickstarter.com/projects/oura/oura-ring-improve-sleep-perform-better/description>, 27 pages Apr. 27, 2016.
OURA Ring review—The Gadgeteer, available online at < https://the-gadgeteer.com/2017/08/11/oura-ring-review/> 16 pages Aug. 11, 2017.
Ouraring.com JZ50-0112 user manual available with Gen 2 ring purchase, 2 pages.
Important Information Please Read JZ50-0148 user manual available with gen 2 ring purchase, 4 pages May 13, 2019.
Important Information Please Read JZ50-0149 user manual available with gen 2 ring purchase, 4 pages May 13, 2019.
Oura Ring | Sleep Tracker and Smart Ring with a Heart Rate Monitor, available online at <https://web.archive.org/web/20180709050831/https://ouraring.com/>, 12 pages Jul. 9, 2018.
Introducing the New Oura Ring Generation 3—The Pulse Blog, available online at <https://ouraring.com/blog/oura-generation2-vs-generation3/>, 3 pages Oct. 26, 2021.
Oura Ring 2 Teardown: Inside the NBA's COVID-19-Detecting Smart Ring, available at < https://www.youtube.com/watch?v=BwA1hmSVgVY> (script) Jul. 9, 2020.
Oura Ring 2 Teardown: Inside the NBA's COVID-19-Detecting Smart Ring, available at < https://www.youtube.com/watch?v=BwA1hmSVgVY> (screenshots) Jul. 9, 2020.
Adafruit, p. 1-2, available at: https://adafruit.com/product/2806, published Jun. 2019 (Year: 2019). Jun. 2019.
Google Translation of KR20170087113A (Year: 2016) 2016 2016.
Sleep Lab validation of a wellness ring detecting sleep patterns based on photoplethysmogram, actigraphy and body temperature published Feb. 9, 2016, to Kinnunen (Year: 2016) 2016.
International Search Report & Written Opinion for PCT/IB2008/053982 dated Mar. 25, 2009.
U.S. Appl. No. 61/768,279, filed 2013.
International Search Report and Written Opinion for PCT/US2007/081119, International Search Authority—European Patent Office—Nov. 4, 2009. Nov. 2009.
Rhee et al., (2000). Artifact-resistant, power-efficient design of finger-ring plethysmographic sensors. Part I: Design and analysis. 4. 2792-2795 vol. 4. 10.1109/IEMBS.2000.901443. 2000.
Rhee et al., (2000). Artifact-resistant, power-efficient design of finger-ring plethysmographic sensors. Part II: Prototyping and benchmarking. 4. 2796-2799 vol. 4. 10.1109/IEMBS.2000.901444. 2000.
Dynamic drinkware-type analysis for mestas.
Liu et al., (2009). UWave: Accelerometer-based personalized gesture recognition and its applications. Pervasive and Mobile Computing. 5. 657-675. 10.1016/j.pmcj.2009.07.007. 2009.
Trigueiros et al., (2019). A comparison of machine learning algorithms applied to hand gesture recognition. 2019.
Castaneda et al., (2018), Int J Biosens Biolectron. 2018, "A review on wearable photoplethysmography sensors and their potential future applications in health care"; 4(4):195-202. doi:10.15406/ijbsbe.2018.04.00125. 2018.
Mendelson et al., (2006). A Wearable Reflectance Pulse Oximeter for Remote Physiological Monitoring. Conference proceedings : . . . Annual International Conference of the IEEE Engineering in Medicine and Biology Society. IEEE Engineering in Medicine and Biology Society. Conference. 1. 912-5. 10.1109/IEMBS.2006.260137. 2006.
Smiley, S., Active RFID vs. Passive RFID: What's the Difference? https://www.atlasrfidstore.com/rfid-insider/active-rfid-vs-passive-rfid/?srsltid=AfmBOoqhNhYwPPUSENIXB8LarZMm3TVQ4ugn4nTNUhfpy-9yYC_j0wdm Mar. 2016.

(56) References Cited

OTHER PUBLICATIONS

Lawton, G., (2022). Active vs. passive RFID tags: Which to choose: TechTarget. Retrieved from: https://www.techtarget.com/searcherp/tip/Active-vs-passive-RFID-tags-Which-to-choose Nov. 2022.
Amma et al., (2010). Airwriting recognition using wearable motion sensors. ACM International Conference Proceeding Series. 10. 10.1145/1785455.1785465. 2010.
Zhou et al., (2012). Analysis and Selection of Features for Gesture Recognition Based on a Micro Wearable Device. International Journal of Advanced Computer Science and Applications. 3. 10.14569/IJACSA.2012.030101. 2012.
Rhee et al., (2001). Artifact-resistant power-efficient design of finger-ring plethysmographic sensors. IEEE transactions on biomedical engineering. 48. 795-805. 10.1109/10.930904. 2001.
Ying et al., (2007). Automatic Step Detection in the Accelerometer Signal. 10.1007/978-3-540-70994-7_14. 2007.
100 Best Inventions of 2020 https://time.com/collection/best-inventions-2020/ 2020.
Clark, B. A.. "Color in Sunglass Lenses*." Optometry and Vision Science 46 (1969): 825-840. 1969.
Rhee, Sokwoo. (2006). Design and analysis of artifact-resistive finger photoplethysmographic sensors for vital sign monitoring /. 2006.
Webster, J.G., Design of pulse oximeters Webster—Institute of Physics Publishing—2003 2003.
Park et al., (2011). E-gesture: A collaborative architecture for energy-efficient gesture recognition with hand-worn sensor and mobile devices. SenSys 2011—Proceedings of the 9th ACM Conference on Embedded Networked Sensor Systems. 359-360. 10.1145/1999995.2000034. 2011.
Teh et al., (2000). Embedding of electronics within thermoplastic polymers using injection moulding technique. Filtration Industry Analyst. 10-18. 10.1109/IEMT.2000.910703. 2000.
Sakai, Tadamoto. (1993). Encapsulation process for electronic devices using injection molding method. Advances in Polymer Technology. 12. 61-71. 10.1002/adv.1993.060120106. 1993.
Ardebili et al.—William Andrew—2019. Encapsulation technologies for electronic applications 2019.
Au et al., (2009). Episodic Sampling: Towards Energy-efficient Patient Monitoring with Wearable Sensors. Conference proceedings : . . . Annual International Conference of the IEEE Engineering in Medicine and Biology Society. IEEE Engineering in Medicine and Biology Society. Conference. 2009. 6901-5. 10.1109/IEMBS.2009.5333615. 2009.
Silverman, A. (2002). Fifty Years of Glass-Making. Industrial & Engineering Chemistry. 18. 10.1021/ie50201a004. 2002.
Petropoulos et al., (2012). Flexible PCB-MEMS flow sensor. Procedia Engineering. 47. 236-239. 10.1016/j.proeng.2012.09.127. 2012.
Schlomer et al., (2008). Gesture Recognition with a Wii Controller. First publ. in: Proceedings of the 2nd International Conference on Tangible and Embedded Interaction 2008, Bonn, Germany, Feb. 18-20, 2008, pp. 11-14. 10.1145/1347390.1347395. 2008.
Rekimoto, J. (2001). GestureWrist and GesturePad: unobtrusive wearable interactiondevices. International Symposium on Wearable Computers, Digest of Papers. 21-27. 10.1109/ISWC.2001.962092. 2001.
Guidelines to Enhancing the Heart-Rate Monitoring Performance of Biosensing Wearables https://www.analog.com/en/resources/technical-articles/guidelines-to-enhancing-the-heartrate-monitoring-performance-of-biosensing-wearables.html 2019.
Krzyanowski, J. "How are PCB's made? A Beginner's Guide to the PCB Manufacturing Process" Retrieved from Knowledge zone https://vectorbluehub.com/how-are-pcbs-made 2023.
Ciofu, et al., (2013) Injection and Micro Injection of Polymeric . . . First edition of the International Scientific Conference Modern Technologies in Machine Manufacturing Technology TMCM ISSN 2067-3604, vol. V, No. 1/2013https://modtech.ro/international-journal/vol5no12013/Ciofu_Ciprian_1.pdf 2013.
Ross, R.J.. (2004). LCP injection molded packages—keys to JEDEC 1 performance. 1807-1811 vol. 2. 10.1109/ECTC.2004.1320364. 2004.
Murphy, K. (2012) Machine learning: a probabilistic perspective 2012.
Olofson et al., Machining of titanium alloys—Battelle Memorial Institute, Defense Metals Information Center—1965 1965.
Asada et al., "Mobile monitoring with wearable photoplethysmographic biosensors," in IEEE Engineering in Medicine and Biology Magazine, vol. 22, No. 3, pp. 28-40, May-Jun. 2003, doi: 10.1109/MEMB.2003.1213624 2003.
Chen et al., (2009). Monitoring Human Movements at Home Using Wearable Wireless Sensors. Engineering Faculty Presentations. 2009.
On the Heels of 1 Million Rings Sold, Oura Now Valued at $2.55 Billion https://www.businesswire.com/news/home/20220405006108/en/On-the-Heels-of-1-Million-Rings-Sold-Oura-Now-Valued-at-2.55-Billion#:~:text=SAN%20FRANCISCO%2D%2D(BUSINESS%20WIRE,of%20selling%201%2C000%2C000%20Oura%20Rings. Apr. 2022.
Lister et al., (2018) Optical properties of human skin https://www.spiedigitallibrary.org/journals/journal-of-biomedical-optics/volume-17/issue-9/090901/Optical-properties-of-human-skin/10.1117/1.JBO.17.9.090901.full 2018.
Uchino et al., (2000). Prediction of Optical Properties of Commercial Soda-Lime-Silicate Glasses Containing Iron. Journal of Non-Crystalline Solids. 261. 72-78. 10.1016/S0022-3093(99)00617-1. 2000.
Lawrence et al., (1989) "Pulse Oximetry" Anesthesiology: The journal of the American Society Of Anesthesiologists, Inc. vol. 70 No. 1 1989.
Konig et al., (1998) "Reflectance Pulse Oximetry-Principles and obstetric application in the zurich system" Journal of Clinical Monitoring and Computing vol. 14 No. 6PG. 3-6 1998.
Hill et al., (2024) The Best Smart Ring To Rule Them All Retrieved from: https://www.wired.com/gallery/best-smart-rings/ 2024.
Kaltenbach, F. (2004). Translucent Materials: Glass, Plastics, Metals 2004.
Zhu et al., (2011). Wearable Sensor-Based Hand Gesture and Daily Activity Recognition for Robot-Assisted Living. IEEE Transactions on Systems, Man, and Cybernetics, Part A. 41. 569-573. 10.1109/TSMCA.2010.2093883. 2011.
Stables et al., (2022). Why the Oura Ring Gen 3 was our wearable of the year. Retrieved from: https://www.wareable.com/wearable-tech/why-the-oura-ring-3-was-our-wearable-of-the-year-2022 2022.
Sun et al., (2013). Wireless Power Transfer for Medical Microsystems. 10.1007/978-1-4614-7702-0. 2013.

* cited by examiner

SMART RING SYSTEM FOR MEASURING STRESS LEVELS AND USING MACHINE LEARNING TECHNIQUES TO PREDICT HIGH RISK DRIVING BEHAVIOR

CROSS-REFERENCES TO RELATED APPLICATIONS

This application claims priority to U.S. Provisional Patent Application No. 62/877,391, filed Jul. 23, 2019, and U.S. Provisional Patent Application No. 62/988,060, filed Mar. 11, 2020, both incorporated by reference herein for all purposes.

FIELD OF DISCLOSURE

The present disclosure generally relates to implementations of smart ring wearable devices and, more particularly, to utilizing a smart ring for predicting a driver's fitness to safely operate a moving vehicle based at least in part upon observed user parameters.

BACKGROUND

Stress is the body's response to adverse or demanding circumstances, such as threat, challenge, physical or psychological barriers. Some of the more common stressors can include: relationship conflicts, financial strain, work responsibilities, increasing demands, loss of a loved one, exposure to a traumatic incident, or health issues. Prolonged stress and a lack of coping resources can have harmful effects on health, including the development and progress of anxiety disorders, metabolic disorders (such as type 11 diabetes), inflammatory disturbances, digestive system disturbances, and cardiovascular disease. These effects can be manifested in, for example, low energy, insomnia, headaches, upset stomach, aches and pains, frequent colds and infections.

High levels of stress and anxiety can directly and indirectly impact drivers' ability to stay focused on the task of driving. Heightened emotions may create a cognitive distraction that can impede drivers' capacity to notice and respond to hazards, and undermined health may offer further diversion of attention away from the road. All of these factors can lead to risky driving behavior and compromise safety on the roads for the drivers under stress and those around them.

BRIEF SUMMARY

The present disclosure relates to a smart wearable ring system and methods that allow for continuous monitoring of the user's stress levels, and using that data to determine a ring wearer's fitness to safely operate a moving vehicle.

The proposed systems and technologies provide many advantages over the existing wearable stress monitoring solutions. The ring form enables a convenient, miniaturized, and unobtrusive device that does not interfere with daytime or nighttime activities.

The smart ring's small size, convenient form, the absence of a fastening buckle is an improvement to the existing form factors, which make the ring more conducive for continuous wear. If the user does not have to remove the device due to discomfort or an interference with an activity, the user will not have to remember to put it back on for data collection. Therefore, the ring form enables for uninterrupted data collection, thus more descriptive data, and more accurate predictions.

The described systems and techniques address the challenge for individuals to identify that they are in a state of stress, and further to assess how their own stress and anxiety levels may impact their driving ability. In an embodiment, this issue is approached by employing a ring-shaped device outfitted with sensors that are able to monitor physiological, chemical, and behavioral indicators that can be associated with being in a state of stress, and a system that trains and implements a Machine Learning (ML) algorithm to make a personalized prediction of the level of driving risk exposure based at least in part upon the captured stress data.

In an embodiment, an inconspicuous and comfortable ring-shaped device, intended to be worn on a user's hand, is outfitted with sensors that are able to collect the ring user's specific parameters indicative of stress patterns. A system trains and implements a Machine Learning (ML) algorithm to make a personalized prediction of the level of driving risk exposure based at least in part upon the captured stress data. The ML model training may be achieved, for example, at a server by first (i) acquiring, via a smart ring, one or more sets of first data indicative of one or more stress patterns; (ii) acquiring, via a driving monitor device, one or more sets of second data indicative of one or more driving patterns; (iii) utilizing the one or more sets of first data and the one or more sets of second data as training data for a ML model to train the ML model to discover one or more relationships between the one or more stress patterns and the one or more driving patterns, wherein the one or more relationships include a relationship representing a correlation between a given stress pattern and a high-risk driving pattern.

In an embodiment, the trained ML model analyzes a particular set of data collected by a particular smart ring associated with a user, and (i) determines that the particular set of data represents a particular stress pattern corresponding to the given stress pattern correlated with the high-risk driving pattern; and (ii) responds to said determining by predicting a level of risk exposure for the user during driving.

The method may further include: (i) predicting a level of driving risk exposure to a driver based at least in part upon analyzed stress patterns; and (ii) communicating the predicted risk exposure; (iii) communicating a selection of the acquired stress parameters; and (iv) determining remediating action, which may be a stress coping strategy, to reduce or eliminate the driving risk; or communicate or implement the remediating action in accordance with various embodiments disclosed herein.

The described embodiment may also enable utilizing biofeedback as one of the remediating actions to assist the user with managing stress. Biofeedback is a technique used to inform one of their body's functions and physiological states, with the purpose of learning how to manipulate them and improve one's condition. Biofeedback can be used to manage stress response by bringing one's conscious awareness to their body's reaction to stress and thus expand the arsenal of stress coping mechanisms. The system measures and communicates to the user their physiological parameters like heart rate, skin conductivity, or cortisol levels, etc. The presentation of these parameters, in combination with the user employing stress coping strategies like changes in thinking and behavior, and accurate feedback of change in the same parameters in response to implemented actions, teaches the user to decrease the harmful physical and psychological effects of stress.

Generally speaking, the described determinations regarding remediation may be made prior to the ring user attempting driving, thereby enabling the smart ring and any associated systems to prevent or discourage the user from driving while exposed to high risk due to deteriorated psychological or physiological conditions stemming from being under stress.

Depending upon the embodiment, one or more benefits may be achieved. These benefits and various additional objects, features and advantages of the present disclosure can be fully appreciated with reference to the detailed description and accompanying drawings that follow.

DETAILED DESCRIPTION

FIG. 1, FIG. 2, FIG. 3, FIG. 4, FIG. 5, FIG. 6, FIG. 7, and FIG. 8 discuss various techniques, systems, and methods for implementing a smart ring to train and implement a machine learning module capable of predicting a driver's risk exposure based at least in part upon observed stress patterns. Specifically, sections I-III and V describe, with reference to FIG. 1, FIG. 2, FIG. 3, and FIG. 5, example smart ring systems, form factor types, and components. Section IV describes, with reference to FIG. 4, an example smart ring environment. Sections VI and VII describe, with reference to FIG. 6 and FIG. 7, example methods that may be implemented via the smart ring systems described herein. And Section VIII describes, with reference to FIG. 8, example elements of a vehicle that may communicate with one of the described smart ring systems to facilitate implementation of the functions described herein.

I. Examples of Smart Ring and Smart Ring Components

Figure 1:
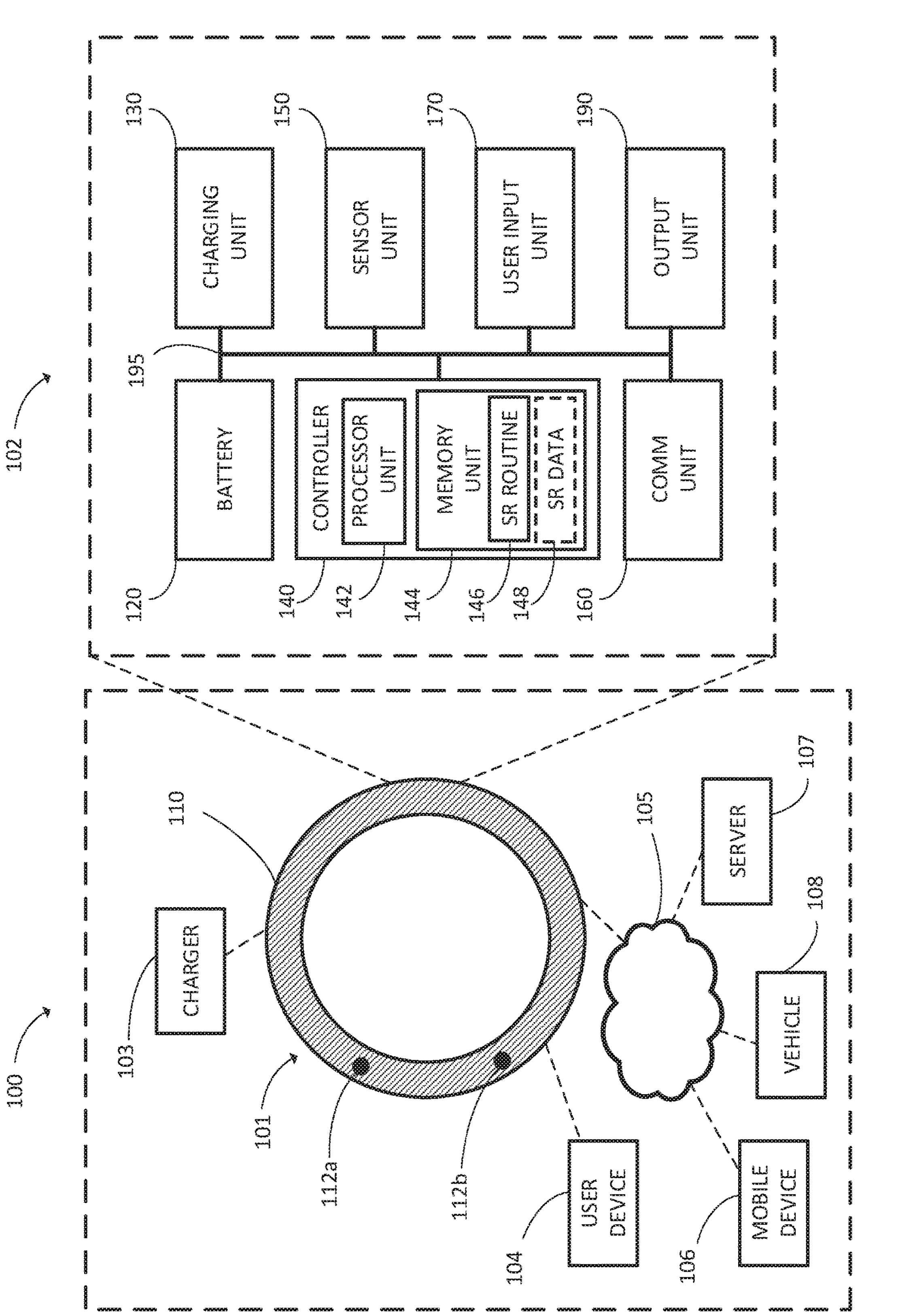
FIG. 1 illustrates a system comprising a smart ring and a block diagram of smart ring components according to some embodiments.

FIG. 1 illustrates a smart ring system 100 for predicting a level of driving risk exposure to a driver based at least in part upon one or more analyzed stress patterns, comprising (i) a smart ring 101 including a set of components 102 and (ii) one or more devices or systems that may be electrically, mechanically, or communicatively connected to the smart ring 101, according to an embodiment. Specifically, the system 100 may include any one or more of: a charger 103 for the smart ring 101, a user device 104, a network 105, a mobile device 106, a vehicle 108, or a server 107. The charger 103 may provide energy to the smart ring 101 by way of a direct electrical, a wireless, or an optical connection. The smart ring 101 may be in a direct communicative connection with the user device 104, the mobile device 106, the server 107, or a vehicle 108 by way of the network 105. Interactions between the smart ring 101 and other components of the system 100 are discussed in more detail in the context of FIG. 4.

The smart ring 101 may sense a variety of signals indicative of: activities of a user wearing the ring 101, measurements of physiological parameters of the user, or aspects of the user's environment. The smart ring 101 may analyze the sensed signals using built-in computing capabilities or in cooperation with other computing devices (e.g., user device 104, mobile device 106, server 107, or vehicle 108) and provide feedback to the user or about the user via the smart ring 101 or other devices (e.g., user device 104, mobile device 106, server 107, or vehicle 108). Additionally or alternatively, the smart ring 101 may provide the user with notifications sent by other devices, enable secure access to locations or information, or a variety of other applications pertaining to health, wellness, productivity, or entertainment. It should be understood that while some figures and select embodiment descriptions refer to a vehicle in the form of an automobile, the technology is not limited to communicating with automotive vehicles. That is, references to a "vehicle" may be understood as referring to any human-operated transportation device or system, such as a train, aircraft, watercraft, submersible, spacecraft, cargo truck, recreational vehicle, agricultural machinery, powered industrial truck, bicycle, motorcycle, hovercraft, etc.

The smart ring 101, which may be referred to herein as the ring 101, may comprise a variety of mechanical, electrical, electrochemical, optical, or any other suitable subsystems, devices, components, or parts disposed within, at, throughout, or in mechanical connection to a housing 110 (which may be ring shaped and generally configured to be worn on a finger). Additionally, a set of interface components 112*a* and 112*b* may be disposed at the housing, and, in particular, through the surface of the housing. The interface components 112*a* and 112*b* may provide a physical access (e.g., electrical, fluidic, mechanical, or optical) to the components disposed within the housing. The interface components 112*a* and 112*b* may exemplify surface elements disposed at the housing. As discussed below, some of the surface elements of the housing may also be parts of the smart ring components.

As shown in FIG. 1, the components 102 of the smart ring 101 may be distributed within, throughout, or on the housing 110. As discussed in the contexts of FIG. 2 and FIG. 3 below, the housing 110 may be configured in a variety of ways and include multiple parts. The smart ring components 102, for example, may be distributed among the different parts of the housing 110, as described below, and may include surface elements of the housing 110. The housing 110 may include mechanical, electrical, electrochemical, optical, or any other suitable subsystems, devices, components, or parts disposed within or in mechanical connection to the housing 110, including a battery 120, a charging unit 130, a controller 140, a sensor system 150 comprising one or more sensors, a communications unit 160, a one or more user input devices 170, or a one or more output devices 190. Each of the components 120, 130, 140, 150, 160, 170, and/or 190 may include one or more associated circuits, as well as packaging elements. The components 120, 130, 140, 150, 160, 170, and/or 190 may be electrically or communicatively connected with each other (e.g., via one or more busses or links, power lines, etc.), and may cooperate to enable "smart" functionality described within this disclosure.

The battery 120 may supply energy or power to the controller 140, the sensors 150, the communications unit 160, the user input devices 170, or the output devices 190.

In some scenarios or implementations, the battery 120 may supply energy or power to the charging unit 130. The charging unit 130, may supply energy or power to the battery 120. In some implementations, the charging unit 130 may supply (e.g., from the charger 103, or harvested from other sources) energy or power to the controller 140, the sensors 150, the communications unit 160, the user input devices 170, or the output devices 190. In a charging mode of operation of the smart ring 101, the average power supplied by the charging unit 130 to the battery 120 may exceed the average power supplied by the battery 120 to the charging unit 130, resulting in a net transfer of energy from the charging unit 130 to the battery 120. In a non-charging mode of operation, the charging unit 130 may, on average, draw energy from the battery 120.

The battery 120 may include one or more cells that convert chemical, thermal, nuclear or another suitable form of energy into electrical energy to power other components or subsystems 140, 150, 160, 170, and/or 190 of the smart ring 101. The battery 120 may include one or more alkaline, lithium, lithium-ion and or other suitable cells. The battery 120 may include two terminals that, in operation, maintain a substantially fixed voltage of 1.5, 3, 4.5, 6, 9, 12 V or any other suitable terminal voltage between them. When fully charged, the battery 120 may be capable of delivering to power-sinking components an amount of charge, referred to herein as "full charge," without recharging. The full charge of the battery may be 1, 2, 5, 10, 20, 50, 100, 200, 500, 1000, 2000, 5000, 10000, 20000 mAh or any other suitable charge that can be delivered to one or more power-consuming loads as electrical current.

The battery 120 may include a charge-storage device, such as, for example a capacitor or a super-capacitor. In some implementations discussed below, the battery 120 may be entirely composed of one or more capacitive or charge-storage elements. The charge storage device may be capable of delivering higher currents than the energy-conversion cells included in the battery 120. Furthermore, the charge storage device may maintain voltage available to the components or subsystems 130, 140, 150, 160, 170, and/or 190 when one or more cells of the battery 120 are removed to be subsequently replaced by other cells.

The charging unit 130 may be configured to replenish the charge supplied by the battery 120 to power-sinking components or subsystems (e.g., one or more of subsystems 130, 140, 150, 160, 170, and/or 190) or, more specifically, by their associated circuits. To replenish the battery charge, the charging unit 130 may convert one form of electrical energy into another form of electrical energy. More specifically, the charging unit 130 may convert alternating current (AC) to direct current (DC), may perform frequency conversions of current or voltage waveforms, or may convert energy stored in static electric fields or static magnetic fields into direct current. Additionally or alternatively, the charging unit 130 may harvest energy from radiating or evanescent electromagnetic fields (including optical radiation) and convert it into the charge stored in the battery 120. Furthermore, the charging unit 130 may convert non-electrical energy into electrical energy. For example, the charging unit 130 may harvest energy from motion, or from thermal gradients.

The controller 140 may include a processor unit 142 and a memory unit 144. The processor unit 142 may include one or more processors, such as a microprocessor (μP), a digital signal processor (DSP), a central processing unit (CPU), a graphical processing unit (GPU), a field-programmable gate array (FPGA), an application-specific integrated circuit (ASIC), or any other suitable electronic processing components. Additionally or alternatively, the processor unit 142 may include photonic processing components.

The memory unit 144 may include one or more computer memory devices or components, such as one or more registers, RAM, ROM, EEPROM, or on-board flash memory. The memory unit 144 may use magnetic, optical, electronic, spintronic, or any other suitable storage technology. In some implementations, at least some of the functionality the memory unit 144 may be integrated in an ASIC or and FPGA. Furthermore, the memory unit 144 may be integrated into the same chip as the processor unit 142 and the chip, in some implementations, may be an ASIC or an FPGA.

The memory unit 144 may store a smart ring (SR) routine 146 with a set of instructions, that, when executed by the processor 142 may enable the operation and the functionality described in more detail below. Furthermore, the memory unit 144 may store smart ring (SR) data 148, which may include (i) input data used by one or more of the components 102 (e.g., by the controller when implementing the SR routine 146) or (ii) output data generated by one or more of the components 102 (e.g., the controller 140, the sensor unit 150, the communication unit 160, or the user input unit 170). In some implementations, other units, components, or devices may generate data (e.g., diagnostic data) for storing in the memory unit 144.

The processing unit 142 may draw power from the battery 120 (or directly from the charging unit 130) to read from the memory unit 144 and to execute instructions contained in the smart ring routine 146. Likewise, the memory unit 144 may draw power from the battery 120 (or directly from the charging unit 130) to maintain the stored data or to enable reading or writing data into the memory unit 144. The processor unit 142, the memory unit 144, or the controller 140 as a whole may be capable of operating in one or more low-power mode. One such low power mode may maintain the machine state of the controller 140 when less than a threshold power is available from the battery 120 or during a charging operation in which one or more battery cells are exchanged.

The controller 140 may receive and process data from the sensors 150, the communications unit 160, or the user input devices 170. The controller 140 may perform computations to generate new data, signals, or information. The controller 140 may send data from the memory unit 144 or the generated data to the communication unit 160 or the output devices 190. The electrical signals or waveforms generated by the controller 140 may include digital or analog signals or waveforms. The controller 140 may include electrical or electronic circuits for detecting, transforming (e.g., linearly or non-linearly filtering, amplifying, attenuating), or converting (e.g., digital to analog, analog to digital, rectifying, changing frequency) of analog or digital electrical signals or waveforms.

In various embodiments, the sensor unit 150 may include one or more sensors disposed within or throughout the housing 110 of the ring 101. Each of the one or more sensors may transduce one or more of: light, sound, acceleration, translational or rotational movement, strain, pressure, temperature, chemical composition, surface conductivity or other suitable signals into electrical or electronic sensors or signals. The one or more sensors may be acoustic, photonic, micro-electro-mechanical systems (MEMS) sensors, chemical, electrochemical, micro-fluidic (e.g., flow sensor), or any other suitable type of sensor. The sensor unit 150 may include, for example, one or more of three-axis accelerometers for detecting orientation and movement of the ring 101.

The sensor unit 150 may alternatively or additionally include an inertial measurement unit (IMU) for detecting orientation and movement of the ring 101, such as one having one or more accelerometers and/or altimeters. The sensor unit 150 may include, for example, electrochemical immunosensors, which may be further integrated with microfluidic devices to monitor the levels of cortisol and/or other hormones which levels can change in response to stress. The sensor unit 150 may include, for example, a microphone, or any other suitable device that converts sound into an electrical signal. The sensor unit 150 may also be equipped with a Global Positioning System (GPS) receiver. The one or more sensors of the sensor unit 150 may provide data indicative, but not limiting to, the user's heart rate (HR), blood pressure, body temperature, skin conductance, skin perfusion, the amount of sweat and its composition, sunlight and/or UV radiation exposure, and vehicular motion data (when the ring user is positioned inside of a moving vehicle). The one or more sensors of the sensor unit 150 may additionally provide the user's behavioral data, such as data on gesticulation, hand grip pressure, body motion data, and enabled with voice and sound processing and speech recognition.

The communication unit 160 may facilitate wired or wireless communication between the ring 101 and one or more other devices. The communication unit 160 may include, for example, a network adaptor to connect to a computer network, and, via the network, to network-connected devices. The computer network may be the Internet or another type of suitable network (e.g., a personal area network (PAN), a local area network (LAN), a metropolitan area network (MAN), a wide area network (WAN), a mobile, a wired or wireless network, a private network, a virtual private network, etc.). The communication unit 160 may use one or more wireless protocols, standards, or technologies for communication, such as Wi-Fi, near field communication (NFC), Bluetooth, or Bluetooth low energy (BLE). Additionally or alternatively, the communication unit 160 may enable free-space optical or acoustic links. In some implementations, the communication unit 160 may include one or more ports for a wired communication connections. The wired connections used by the wireless communication module 160 may include electrical or optical connections (e.g., fiber-optic, twisted-pair, coaxial cable).

User input unit 170 may collect information from a person wearing the ring 101 or another user, capable of interacting with the ring 101. In some implementations, one or more of the sensors in the sensor unit 150 may act as user input devices within the user input unit 170. User input devices may transduce tactile, acoustic, video, gesture, or any other suitable user input into digital or analog electrical signal, and send these electrical signals to the controller 140.

The output unit 190 may include one or more devices to output information to a user of the ring 101. The one or more output devices may include acoustic devices (e.g., speaker, ultrasonic); haptic, thermal, electrical devices; electronic displays for optical output, such as an organic light emitting device (OLED) display, a laser unit, a high-power light-emitting device (LED), etc.; or any other suitable types of devices. For example, the output unit 190 may include a projector that projects an image onto a suitable surface. In some implementations, the sensor unit 150, the user input unit 170, and the output unit 190 may cooperate to create a user interface with capabilities (e.g., a keyboard) of much larger computer systems, as described in more detail below.

The components 120, 130, 140, 150, 160, 170, and/or 190 may be interconnected by a bus (not shown), which may be implemented using one or more circuit board traces, wires, or other electrical, optoelectronic, or optical connections. The bus may be a collection of electrical power or communicative interconnections. The communicative interconnections may be configured to carry signals that conform to any one or more of a variety of protocols, such as I2C, SPI, or other logic to enable cooperation of the various components.

II. Example Smart Ring Form Factor Types

Figure 2:
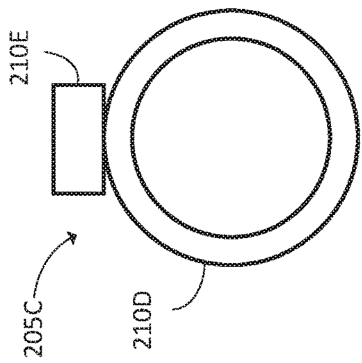
FIG. 2 illustrates a number of different form factor types of a smart ring according to some embodiments.
Figure 2:
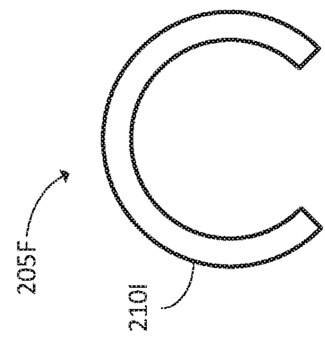
Figure 2:
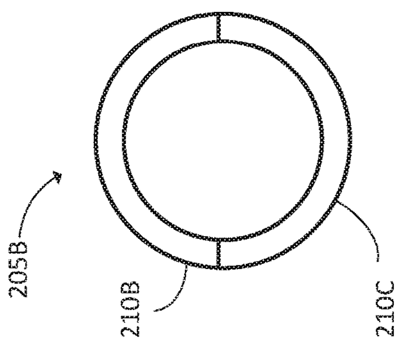
Figure 2:
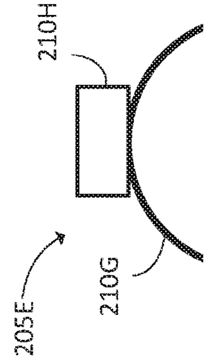
Figure 2:
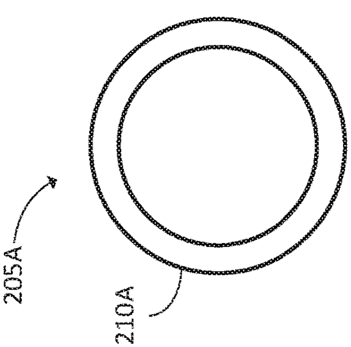
Figure 2:
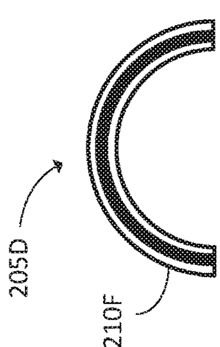

FIG. 2 includes block diagrams of a number of different example form factor types or configurations 205*a*, 205*b*, 205*c*, 205*d*, 205*e*, and/or 205*f* of a smart ring (e.g., the smart ring 101). The configurations 205*a*, 205*b*, 205*c*, 205*d*, 205*e*, and/or 205*f* (which may also be referred to as the smart rings 205*a*, 205*b*, 205*c*, 205*d*, 205*e*, and/or 205*f*) may each represent an implementation of the smart ring 101, and each may include any one or more of the components 102 (or components similar to the components 102). In some embodiments, one or more of the components 102 may not be included in the configurations 205*a*, 205*b*, 205*c*, 205*d*, 205*e*, and/or 205*f*. The configurations 205*a*, 205*b*, 205*c*, 205*d*, 205*e*, and/or 205*f* include housings 210*a*, 210*b*, 210*c*, 210*d*, 210*e*, and/or 210*f*, which may be similar to the housing 110 shown in FIG. 1.

The configuration 205*a* may be referred to as a band-only configuration comprising a housing 210*a*. In the configuration 205*b*, a band may include two or more removably connected parts, such as the housing parts 210*b* and 210*c*. The band may also have an inner diameter ranging between 13 mm and 23 mm. The two housing parts 210*b* and 210*c* may each house at least some of the components 102, distributed between the housing parks 210*b* and 210*c* in any suitable manner.

The configuration 205*c* may be referred to as a band-and-platform configuration comprising (i) a housing component 210*d* and (ii) a housing component 210*e* (sometimes called the "platform 210*e*"), which may be in a fixed or removable mechanical connection with the housing 210*d*. The platform 210*e* may function as a mount for a "jewel" or for any other suitable attachment. The housing component 210*d* and the platform 210*e* may each house at least one or more of the components 102 (or similar components).

In some instances, the term "smart ring" may refer to a partial ring that houses one or more components (e.g., components 102) that enable the smart ring functionality described herein. The configurations 205*d* and 205*e* may be characterized as "partial" smart rings, and may be configured for attachment to a second ring. The second ring may be a conventional ring without smart functionality, or may be second smart ring, wherein some smart functionality of the first or second rings may be enhanced by the attachment.

The configuration 205*d*, for example, may include a housing 210*f* with a groove to enable clipping onto a conventional ring. The grooved clip-on housing 210*f* may house the smart ring components described above. The configuration 205*e* may clip onto a conventional ring using a substantially flat clip 210*g* part of the housing and contain the smart ring components in a platform 210*h* part of the housing.

The configuration 205*f*, on the other hand, may be configured to be capable of being mounted onto a finger of a user without additional support (e.g., another ring). To that end, the housing 210*i* of the configuration 205*f* may be substantially of a partial annular shape subtending between 180 and 360 degrees of a full circumference. When implemented as a partial annular shape, the housing 210*i* may be more adaptable to fingers of different sizes that a fully annular band (360 degrees), and may be elastic. A restorative force produced by a deformation of the housing 210*i* may ensure a suitable physical contact with the finger. Additional suitable combinations of configurations (not illustrated) may combine at least some of the housing features discussed above.

III. Example Smart Ring Surface Elements

Figure 3:
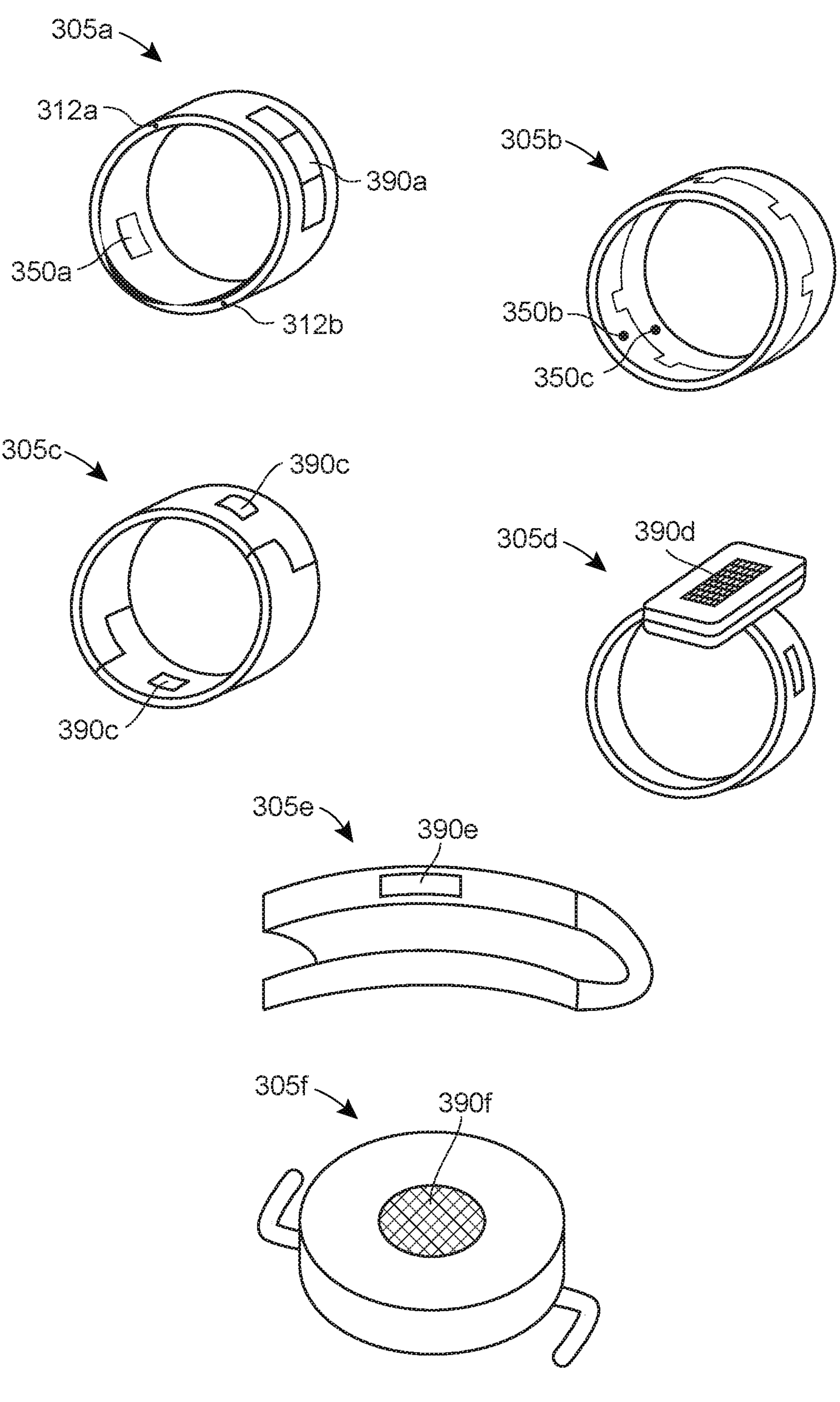
FIG. 3 illustrates examples of different smart ring surface elements.

FIG. 3 includes perspective views of example configurations 305*a*, 305*b*, 305*c*, 305*d*, 305*e*, and/or 305*f* of a smart right (e.g., the smart ring 101) in which a number of surface elements are included.

Configuration 305*a* is an example band configuration 205*a* of a smart ring (e.g., smart ring 101). Some of the surface elements of the housing may include interfaces 312*a*, 312*b* that may be electrically connected to, for example, the charging unit 130 or the communications unit 160. On the outside of the configuration 305*a*, the interfaces 312*a*, 312*b* may be electrically or optically connected with a charger to transfer energy from the charger to a battery (e.g., the battery 120), or with another device to transfer data to or from the ring 305*a*. The outer surface of the configuration 305*a* may include a display 390*a*, while the inner surface may include a biometric sensor 350*a*.

The configurations 305*b* and 305*c* are examples of configurations of a smart ring with multiple housing parts (e.g., configuration 205*b* in FIG. 2). Two (or more) parts may be separate axially (configuration 305*b*), azimuthally (configuration 305*c*), or radially (nested rings, not shown). The parts may be connected mechanically, electrically, or optically via, for example, interfaces analogous to interfaces 312*a*. 312*b* in configuration 305*a*. Each part of a smart ring housing may have one or more surface elements, such as, for example, sensors 350*b*, 350*c* or output elements 390*b*, 390*c*. The latter may be LEDs (e.g., output element 390*b*) or haptic feedback devices (e.g., output element 390*c*), among other suitable sensor or output devices. Additionally or alternatively, at least some of the surface elements (e.g., microphones, touch sensors) may belong to the user input unit 170.

Configuration 305*d* may be an example of a band and platform configuration (e.g., configuration 205*c*), while configurations 305*e* and 305*f* may be examples of the partial ring configurations 205*d* and 205*e*, respectively. Output devices 390*d*, 390*e*, 390*f* on the corresponding configurations 305*d*, 305*e*, 305*f* may be LCD display, OLED displays, e-ink displays, one or more LED pixels, speakers, or any other suitable output devices that may be a part of a suite of outputs represented by an output unit (e.g., output unit 190). Other surface elements, such as an interface component 312*c* may be disposed within, at, or through the housing. It should be appreciated that a variety of suitable surface elements may be disposed at the illustrated configurations 305*a*, 305*b*, 305*c*, 305*d*, 305*e*, and/or 305*f* at largely interchangeable locations. For example, the output elements 390*d*, 390*e*, 390*f* may be replaced with sensors (e.g., UV sensor, ambient light or noise sensors, etc.), user input devices (e.g., buttons, microphones, etc.), interfaces (e.g., including patch antennas or optoelectronic components communicatively connected to communications units), or other suitable surface elements.

IV. Example Environments for Smart Ring Operation

Figure 4:
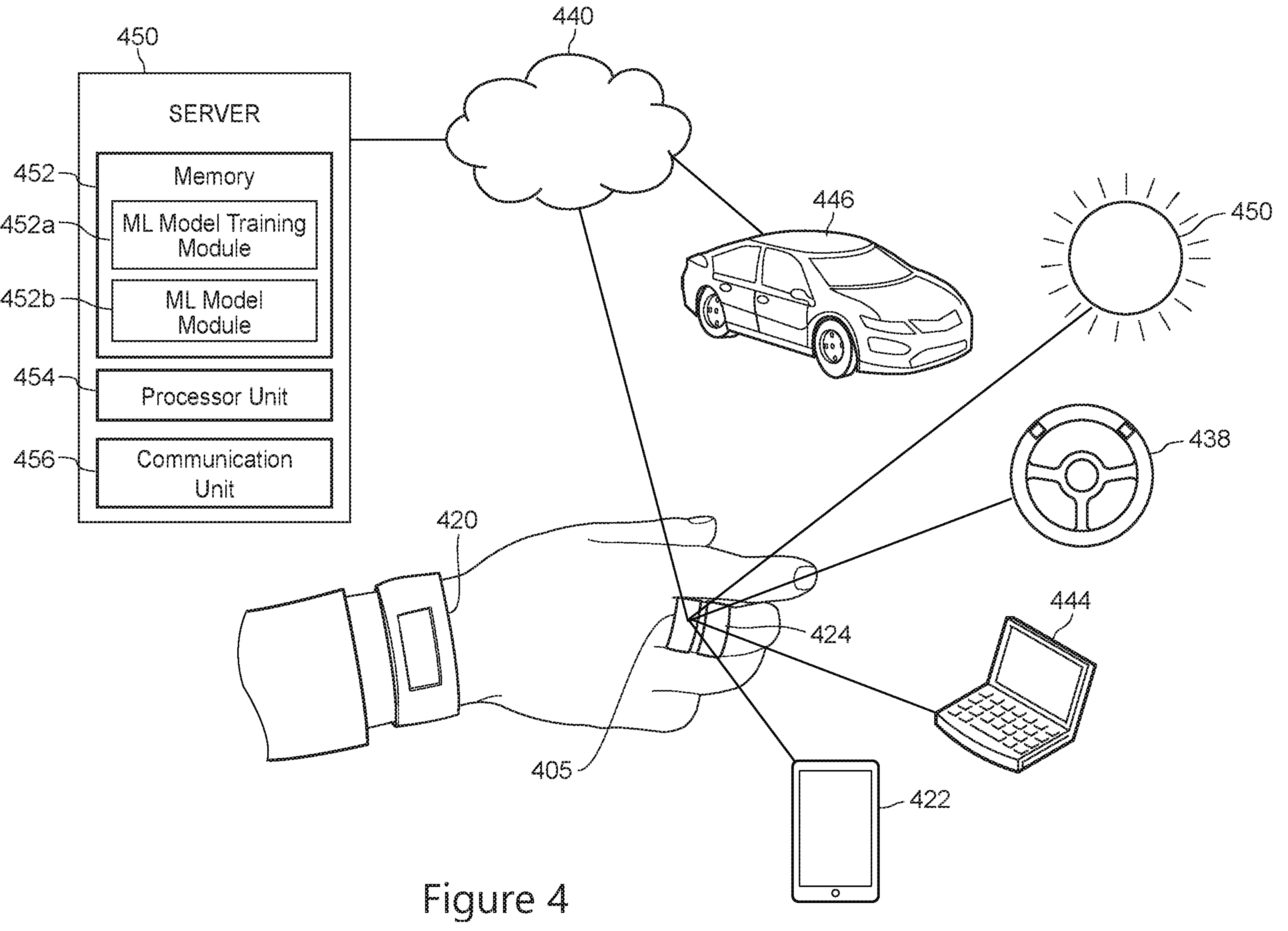
FIG. 4 illustrates example environments for smart ring operation.

FIG. 4 illustrates an example environment 400 within which a smart ring 405 may be configured to operate. In an embodiment, the smart ring 405 may be the smart ring 101. In some embodiments, the smart ring 405 may be any suitable smart ring capable of providing at least some of the functionality described herein. Depending on the embodiment, the smart ring 405 may be configured in a manner similar or equivalent to any of the configurations 205*a*, 205*b*, 205*c*, 205*d*, 205*e*, and/or 205*f* or 305*a*, 305*b*, 305*c*, 305*d*, 305*e*, and/or 305*f* shown in FIG. 2 and FIG. 3.

The smart ring 405 may interact (e.g., by sensing, sending data, receiving data, receiving energy) with a variety of devices, such as bracelet 420 or another suitable wearable device, a mobile device 422 (e.g., a smart phone, a tablet, etc.) that may be, for example, the user device 104, another ring 424 (e.g., another smart ring, a charger for the smart ring 405, etc.), or a steering wheel 438 (or another vehicle interface). Additionally or alternatively, the smart ring 405 may be communicatively connected to a network 440 (e.g., WiFi, 5G cellular), and by way of the network 440 (e.g., network 105 in FIG. 1) to a server 450 (e.g., server 107 in FIG. 1), a personal computer 444 (e.g., mobile device 106), or a vehicle 446 (which may be the vehicle 108). Additionally or alternatively, the ring 405 may be configured to sense or harvest energy from natural environment, such as the sun 450.

A. Server 450

The server 450 is an electronic computing device including one non-transitory computer-readable memory 452 storing instructions executable on a processor unit 454, and a communication unit 456, each of which may be communicatively connected to a system bus (not shown) of the server 450. In some instances, the described functionality of the server 450 may be provided by a plurality of servers similar to the server 450. The memory 452 of the server 450 includes a Machine Learning (ML) model training module 452*a*, and a ML model module 452*b*, which are a set of machine readable instructions (e.g., a software module, application, or routine). In some embodiments, the server 450 can function as a database to store data utilized by the ML modules 452*a* and 452*b*, as well as the model results.

At a high level, the ML model 452*b* is configured to predict the user's level of driving risk exposure based at least in part upon the user's stress data, and the ML training module 452*a* is configured to train the model module 452*b* with the user's stress data in combination with driving data. The Machine Learning model modules 452*a* and 452*b* are described in greater detail in FIG. 6 below.

B. Ring Communicating with Other Devices

The ring 405 may exchange data with other devices by communicatively connecting to the other devices using, for example, the communication unit 160. The communicative connection to other device may be scheduled, initiated by the ring 405 in response to user input via the user input unit 170, in response to detecting trigger conditions using the sensor unit 150, or may be initiated by the other devices. The communicative connection may be wireless, wired electrical connection, or optical. In some implementation, establishing a communicative link may include establishing a mechanical connection.

The ring 405 may connect to other devices (e.g., a device with the built in charger 103) to charge the battery 120. The connection to other devices for charging may enable the ring 405 to be recharged without the need for removing the ring 405 from the finger. For example, the bracelet 420 may include an energy source that may transfer the energy from the energy source to battery 120 of the ring 405 via the charging unit 130. To that end, an electrical (or optical) cable may extend from the bracelet 420 to an interface (e.g., interfaces 112*a*, 112*b*, 312*a*, 312*b*) disposed at the housing (e.g., housings 110, 210*a*. 210*b*, 210*c*, 210*d*, 210*e*, 210*f*. 210*g*, 210*h*, and/or 210*i*) of the ring 405. The mobile device 422, the ring 424, the steering wheel 438 may also include energy source configured as chargers (e.g., the charger 103) for the ring 405. The chargers may transfer energy to the ring 405 via a wired or wireless (e.g., inductive coupling) connection with the charging unit 130 of the ring 405.

V. Example Displays

Figure 5:
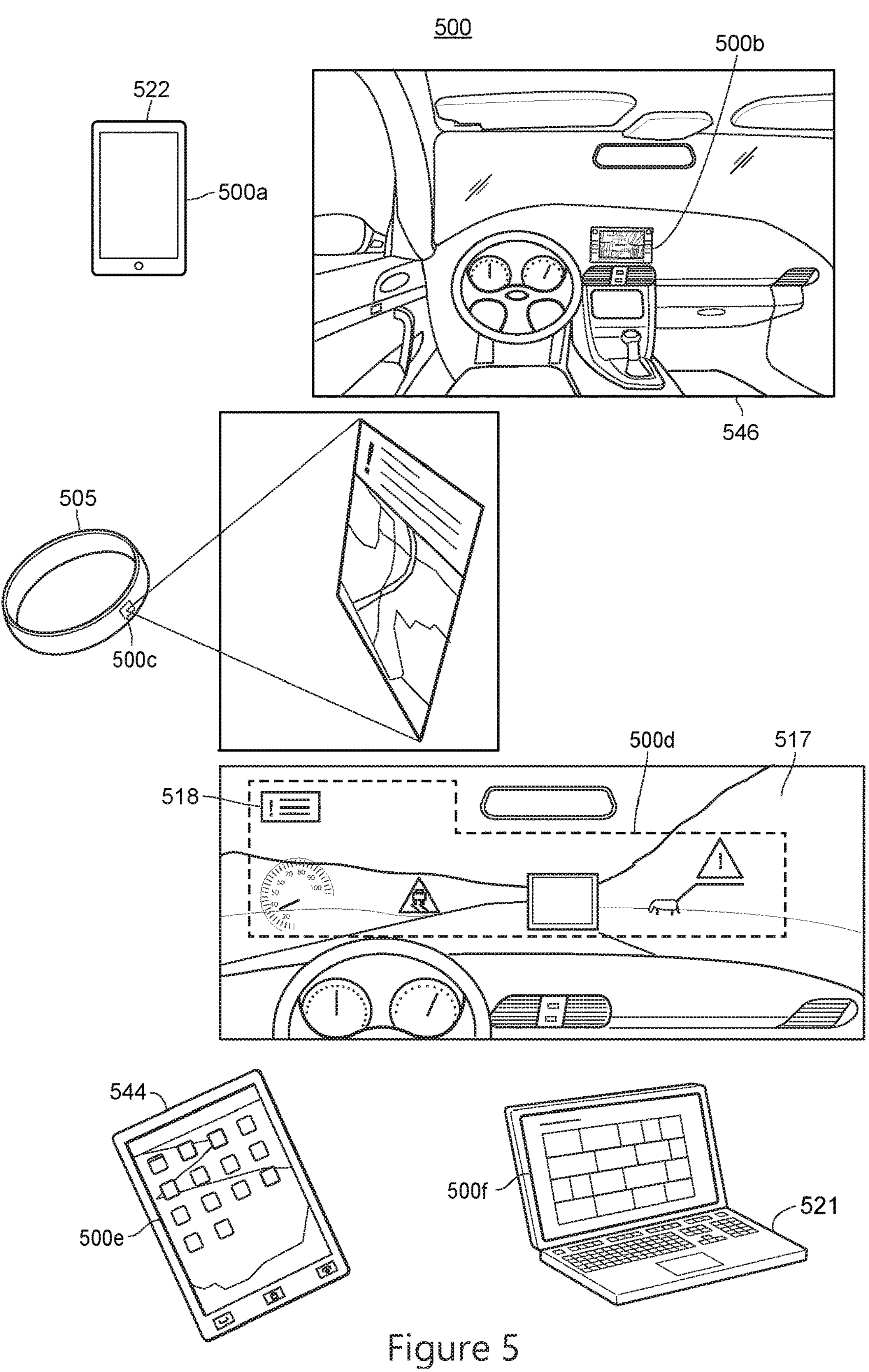
FIG. 5 illustrates example displays.

FIG. 5 illustrates a set of example display devices 500 according to various embodiments, including example displays 500*a*, 500*b*, 500*c*, 500*d*, 500*e*, and/or 500*f* that may be provided by way of a smart ring such as the smart ring 101 of FIG. 1 or 405 of FIG. 5, for the purpose of displaying information relevant to monitored stress patterns, predicted risk exposure, and a remediating action to restore or eliminate risk exposure (e.g., providing a user notification). Each of the display devices 500 may be part of the system 100 shown in FIG. 1, and each may be utilized in place of or in addition to any one or more of the display devices shown in FIG. 1. Each display device 500 may be similar in nature to any of the display devices of ring 405, user device 422, mobile device 444, or vehicle 446 shown in FIG. 4, capable of performing similar functions and interfacing with the same or similar systems; and each of the devices 101, 405, 422, 444, and 446 may provide output via any of the displays 500*a*. 500*b*, 500*c*, 500*d*, 500*e*, and/or 500*f*, in addition to or in place of their respective displays, if desired.

In an embodiment, the display devices 500 may display the level of driving risk exposure data (e.g., as a score, a figure, a graph, a symbol, or a color field, etc.), measured physiological or biochemical parameters (e.g., as a written text, a number, a score, a figure, or a symbol, etc.), and the suggested remediating actions, such as stress coping strategies (e.g., as a written text, a code, a figure, a graph, or a symbol, etc.). Examples of remediating actions will be described later in more detail. More generally, each of the display devices 500 may present visual information based at least in part upon data received from any of the devices 405, 422, 444, 446, or the server 450 shown in FIG. 4.

As shown, the display device 500*a* is a screen of a mobile phone 522 (e.g., representing an example of the mobile device 422) that may be coupled to the smart ring 405. The display device 500*b* is an in-dash display of a vehicle 546 (e.g., representing an example of a display integrated into the dash or console of the vehicle 446) that may be coupled to the smart ring 405. The display device 500*c* is a projector for smart ring 505 (e.g., representing an example of the smart ring 405), which could be part of the ring output unit 190 and its example output devices 390*d*, 390*e*, 390*f*. The display device 500*d* is a heads-up display (HUD) for a vehicle (e.g., the vehicle 446) projected onto a windshield 517, which may also communicate with the smart ring 405 via the network 440. Alert 518 is a sample alert, which may display to the user any combination of a predicted level of driving risk exposer (e.g., driving risk score) and a suggested remediating action. The display device 500*e* is a screen for a tablet 544 (e.g., representing an example of the mobile device 444, which may communicate with the smart ring 405). The display device 500*f* is a screen for a laptop 521 (e.g., representing an example of the mobile device 444, which may communicate with the smart ring 405) that may be coupled to the smart ring 405.

VI. An Example Method of Developing and Utilizing a Machine Learning Model

Figure 6:
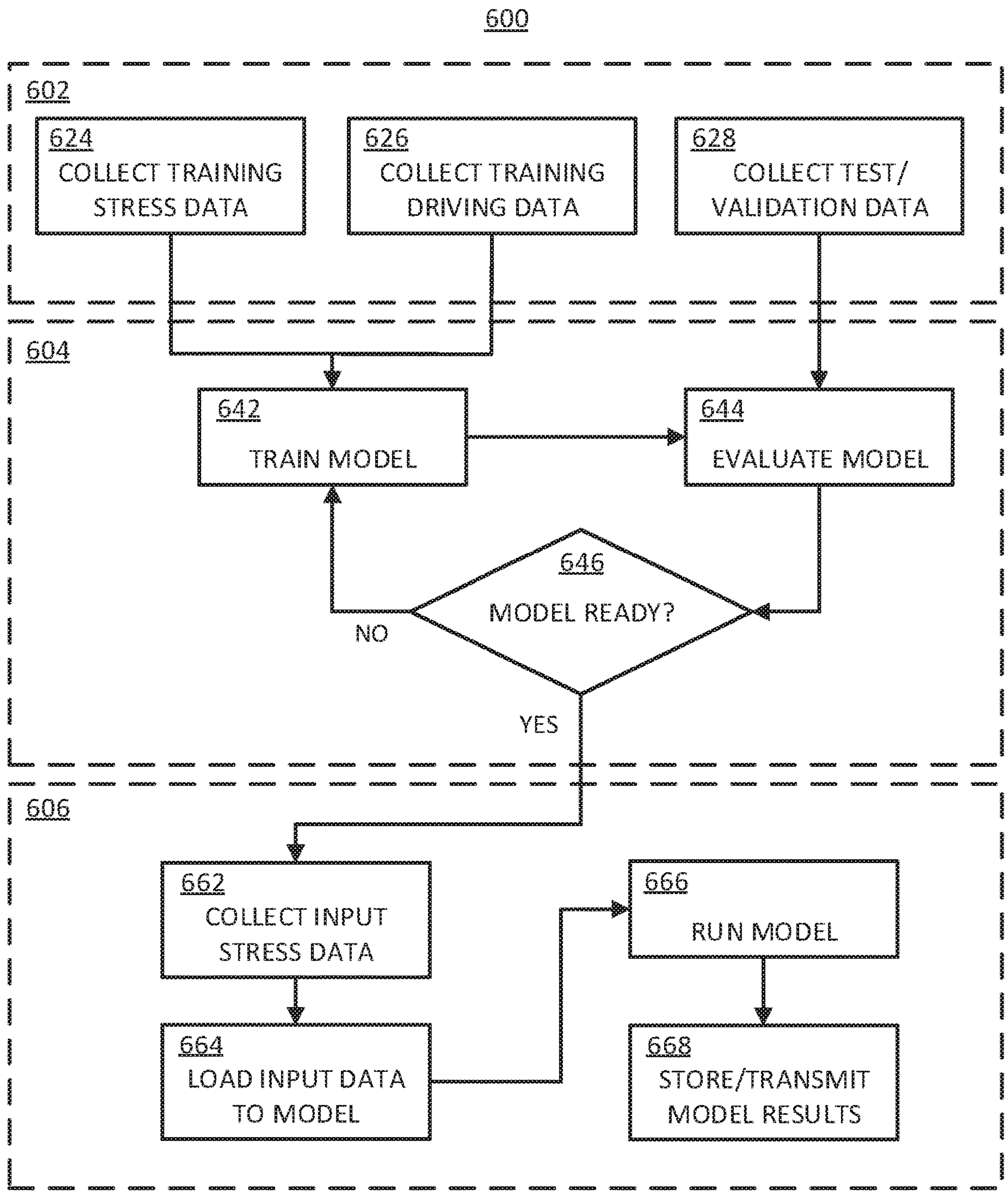
FIG. 6 shows an example method for training and utilizing a ML model that may be implemented via the example system shown in FIG. 4.

FIG. 6 depicts an example method 600 for training, evaluating and utilizing the Machine Learning (ML) model for predicting the level of driving risk exposure based at least in part upon acquired sensor data indicative of one or more stress patterns. At a high level, the method 600 includes a step 602 for model design and preparation, a step 604 for model training and evaluation, and a step 606 for model deployment.

Depending on the implementation, the ML model may implement supervised learning, unsupervised learning, or semi-supervised learning. Supervised learning is a learning process for generalizing on problems where a prediction is needed. A "teaching process" compares predictions by the model to known answers (labeled data) and makes corrections in the model. In such an embodiment, the driving data may be labeled according to a risk level (e.g., depending on the nature and severity of swerving, braking, observed driver distraction, proximity to other vehicles, rates of acceleration, etc.). Unsupervised learning is a learning process for generalizing the underlying structure or distribution in unlabeled data. In an embodiment utilizing unsupervised learning, the system may rely on unlabeled stress data, unlabeled driving data, or some combination thereof. During unsupervised learning, natural structures are identified and exploited for relating instances to each other. Semi-supervised learning can use a mixture of supervised and unsupervised techniques. This learning process discovers and learns the structure in the input variables, where typically some of the input data are labeled, and most is unlabeled. The training operations discussed herein may rely on any one or more of supervised, unsupervised, or semi-supervised learning with regard to the stress data and driving data, depending on the embodiment.

A. Machine Learning Model Preparation

The step 602 may include any one or more steps or sub-steps 624, 626, 628, which may be implemented in any suitable order. At the step 624, the ML model training module 452*a* receives from the processor unit 454 via the communication unit 456, one or more first training data sets indicative of one or more stress patterns for training the selected model.

In some embodiments, the one or more sets of the first training data may be collected from any suitable stress monitoring device, for example the smart ring 405 (equipped with the one or more ring sensors 150), the user device 444 (e.g., a dedicated stress monitoring device), the mobile device 422 equipped with the ability to collect and transmit a variety of data indicative of stress patterns (e.g., a smart phone), a built-in device of the vehicle 446 (e.g., a device capable of observing, collecting, and transmitting driver's stress indicators), or an external database (not shown). In one embodiment, the training data may contain the user's physiological data acquired from the one or more physiological sensors, the data on the user's level of stress hormone or hormones acquired from the one or more electrochemical sensors, the data on the user's gesticulation from the one or more motion sensors, the data on the user's hand grip pressure acquired from the one or more pressure sensors, and audio data from the one or more microphones. These data, for example, may contain measurements of the user's heart rate, blood pressure, body temperature, skin electrodermal activity (also known as galvanic skin response), sweat amount and sweat concentration of particular substances, blood levels of particular substances, hand movements and gestures indicative of a person under stress, the data on sounds and utterances from the user indicative of a person under stress, and a date and time stamp of these measurements.

In some embodiments, the first training data sets may include data indicative of stress patterns for users other than the user associated with the smart ring, in addition to or instead of data indicative of stress patterns for the user associated with the smart ring. The first training data sets may be stored on the server memory 452, or the ring memory unit 144, or any other suitable device or its component(s).

At the step 626, the ML module **452*a* receives from the processor unit 454 via the communication unit 456, one or more second training data sets indicative of one or more driving patterns for training the machine learning model. This second training data may be collected from the ring 405, a vehicle computer 810 of the vehicle 446, the user device 422 (e.g., a mobile phone), the mobile device 444 (e.g., a laptop), or any other suitable electronic driving tracker configured for tracking driving patterns, or an external database (not shown) that has received the second training data from any suitable means. The data may contain tracking of the behavior of the vehicle 446, while operated by the user wearing the ring 405 (e.g., braking, accelerating/decelerating, swerving, proximity to other vehicles, adherence to lane markers and other road markers, adherence to speed limits, etc.). In some embodiments, the second training data sets may include data indicative of driving patterns for users other than the user associated with the smart ring in addition to or instead of data indicative of driving patterns for the user associated with the smart ring. At the step 628**, the ML module receives test data for testing the model or validation data for validating the model (e.g., from one of the described respective data sources). Some or all of the training, test, or validation data sets may be labeled with a pre-determined scale of driving risk scores and thresholds indicative of trigger conditions. The developed model may utilize this scale to rank the target features of the model, and in some implementations determine the level of driving risk exposure.

B. Machine Learning Model Training

The ML model development and evaluation module of the step 604, which takes place in the ML model training module **452*a*, may include any one or more steps or sub-steps 642, 644, 646, which may be implemented in any suitable order. In a typical example, at step 642, the training module 452*a* trains the ML model 452*b* by running the one or more training data sets described above. At step 644, the module 452*a* evaluates the model 452*b*, and at step 646, the module 452*a* determines whether or not the model 452*b* is ready for deployment before either proceeding to step 606 or returning to step 642** to further develop, test, or validate the model.

Regarding the sub-step 642 of the step 604, developing the model typically involves training the model using training data. At a high level, machine-learning models are often utilized to discover relationships between various observable features (e.g., between predictor features and target features) in a training dataset, which can then be applied to an input dataset to predict unknown values for one or more of these features given the known values for the remaining features. These relationships are discovered by feeding the model training data including instances each having one or more predictor feature values and one or more target feature values. The model then "learns" an algorithm capable of calculating or predicting the target feature values (e.g., high risk driving patterns) given the predictor feature values (e.g., stress patterns).

Regarding the sub-step 644 of the step 604, evaluating the model typically involves testing the model using testing data or validating the model using validation data. Testing/validation data typically includes both predictor feature values and target feature values (e.g., including stress patterns for which corresponding driving patterns are known), enabling comparison of target feature values predicted by the model to the actual target feature values, enabling one to evaluate the performance of the model. This testing/validation process is valuable because the model, when implemented, will generate target feature values for future input data that may not be easily checked or validated. Thus, it is advantageous to check one or more accuracy metrics of the model on data for which you already know the target answer (e.g., testing data or validation data), and use this assessment as a proxy for predictive accuracy on future data. Example accuracy metrics include key performance indicators, comparisons between historical trends and predictions of results, cross-validation with subject matter experts, comparisons between predicted results and actual results, etc.

Regarding the sub-step 646 of the step 604, the processor unit 454 may utilize any suitable set of metrics to determine whether or not to proceed to the step 606 for model deployment. Generally speaking, the decision to proceed to the step 606 or to return to the step 642 will depend on one or more accuracy metrics generated during evaluation (the step 644). After the sub-steps 642, 644, 646 of the step 604 have been completed, the processor unit 454 may implement the step 606.

C. Machine Learning Model Implementation

The step 606 may include any one or more steps or sub-steps 662, 664, 666, 668, which may be implemented in any suitable order. In a typical example, the processor unit 454 collects input data (step 662), loads the input data into the model module **452*b* (step 664), runs the model with the input data (step 666), and stores results generated from running the model on the memory 452 (step 668**).

Note, the method 600 may be implemented in any desired order and may be at least partially iterative. That is, the step 602 may be implemented after the step 604 or after the step 606 (e.g., to collect new data for training, testing, or validation), and the step 604 may be implemented after the step 606 (e.g., to further improve the model via training or other development after deployment).

Figure 7:
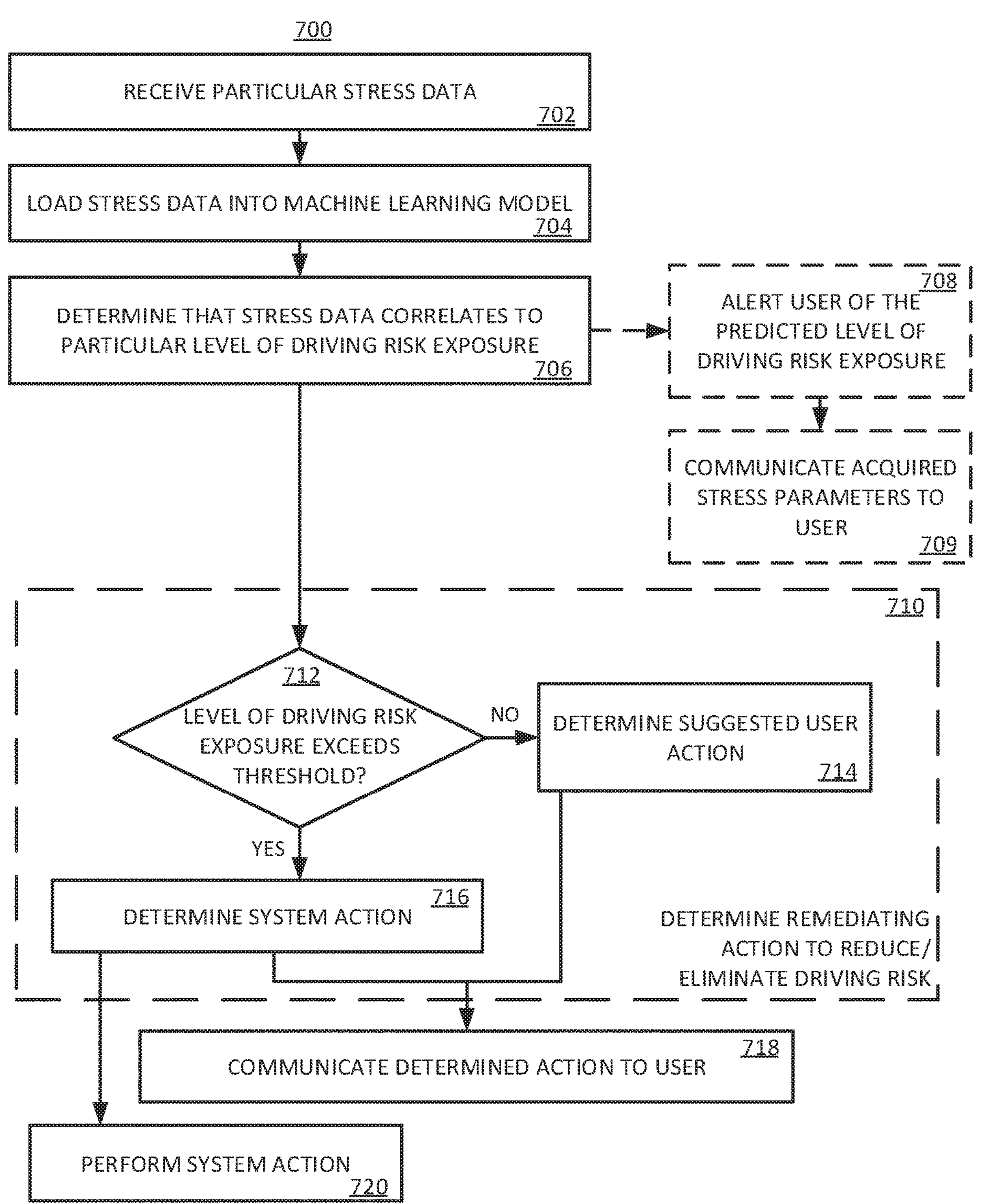
FIG. 7 illustrates example methods for assessing and communicating predicted level of driving risk exposure.

VII. Example Methods for Assessing and Communicating Predicted Level of Driving Risk Exposure FIG. 7 illustrates a flow diagram for an exemplary method 700 for implementing the ML model module **452*b*** to: (i) predict a level of driving risk exposure to a driver (e.g., by determining the driving risk score) based at least in part upon analyzed stress patterns; (ii) communicate the predicted risk exposure (e.g., generate a notification to alert the user of the predicted level of risk exposure), and/or communicate a selection of the acquired stress parameters to the user (e.g., generate a notification to inform the user of the values of the measured parameters indicative of elevated stress levels); and (iii) determine remediating action to reduce or eliminate the driving risk; or communicate or implement the remediating action in accordance with various embodiments disclosed herein. Generally speaking, the described determinations regarding remediation may be made prior to the ring user attempting driving, thereby enabling the smart ring and any associated systems to prevent or discourage the user from driving while exposed to high risk due to a deteriorated psychological or physiological conditions stemming from being under stress.

The method 700 may be implemented by way of all, or part, of the computing devices, features, and/or other functionality described regarding FIG. 1, FIG. 4, FIG. 5, and FIG. 6. At a high level, the server 450 receives stress data and predicts a level of driving risk exposure (e.g., represented by a risk score) based at least in part upon the stress data In an embodiment, the predicted level of risk exposure may be a binary parameter having two possible values (e.g., high and low risk), a ternary parameter having three possible values (e.g., high, medium, low), or a parameter having any suitable number of values (e.g., a score based parameter having a value of 0-10, 0-100, etc.). Then, based at least in part upon the predicted risk exposure, a remediation may be determined and implemented (e.g., by the system 100) or communicated to the user (e.g., via one of the example display devices 500 of the system 100, or other suitable devices of the ring output unit 190) to prevent or dissuade driving while a high exposure to risk exists.

More specifically, in an embodiment, the ML model module 452*b* of server 450 receives one or more particular stress data sets from one or more data sources (step 702). In some embodiments, this data may be collected from one or more smart ring sensors 105, the user device 422 (e.g., a smart phone), or the mobile device 444 (e.g., a stress tracking device). In one embodiment, the stress data may contain the user's physiological data acquired from the one or more physiological sensors, the data on the user's level of stress hormone or hormones acquired from the one or more electrochemical sensors, the data on the user's gesticulation from the one or more motion sensors, the data on the user's hand grip pressure acquired from the one or more pressure sensors, and audio data from the one or more microphones. These data, for example, may contain measurements of the user's heart rate, blood pressure, body temperature, electrodermal activity, sweat amount and sweat concentration of particular stress hormones, blood levels of particular substances, hand movements and gestures indicative of a person under stress, the data on sounds and utterances from the user indicative of a person under stress, and a date and time stamp of these measurements. At step 704, the stress data may be loaded into the ML model module 452*b*.

At step 706 ML model module 452*b* may determine that particular stress data correlates to a particular level of driving risk exposure, which is determined at step 606 of the ML model. For example, the module 452*b* may determine that a particular level of stress hormone correlates with high risk driving behavior (e.g., faster driving, high acceleration, more aggressive turning or braking, more accidents, closer average proximity to other vehicles or pedestrians, etc.). Likewise, other factors represented by the stress data (e.g., particular hand grip pressure(s), gesticulation(s), hear rate(s), blood pressure(s), body temperature(s), skin conductance(s), sweat amount(s) or sweat composition(s), spoken words(s) or sound(s), etc.) may correlate with high risk driving behavior.

At step 708, a communication unit of an output device of system 100 (one or more implementations of the ring output unit 190, or one or more of the display technologies depicted in FIG. 5) may alert the smart ring user of the predicted level of driving risk exposure (e.g., represented by a driving risk score). For example, the alert may be visual (e.g., a written text, an image, a color code, etc.), haptic, thermal, or an audio alert. At step 709, a communication unit of an output device of system 100 (one or more implementations of the ring output unit 190, or one or more of the display technologies depicted in FIG. 5) may communicate to the user any combination of the acquired parameters indicating that the user is under stress. Steps 708 and 709 may or may not be implemented, depending on the embodiment.

In various embodiments, an analyzing device (whether it is the server 450, or the ring 405, or the user device 422, or the mobile device 444), may use the particular stress data and the assessed level of driving risk exposure to make a determination of a suggested action or actions to improve the particular driving risk (step 710). In some embodiments, the analyzing device, at step 712, may assess whether the calculated driving risk exceeds a pre-determined threshold indicating that the ring user's condition is not fit for safe driving. If evaluation at step 712 yields that the driving risk score does not exceed the threshold, but presents a probability of high risk driving behavior, then further assessment at step 714 determines a suitable user action to reduce or eliminate the current driving risk. For instance, the suggested user action may be a stress reducing strategy such as to take a nap or a walk, or exercise, or reach out for emotional support before driving, or a suitable stress coping strategy that can be implemented while operating a vehicle: such as to follow suggested breathing exercises, to listen to certain type of music, sing or hum a favorite tune, etc. At step 718, similarly to step 708, a communication unit of an output device may relay to the smart ring user the suggested user action. In some embodiments, step 718 may be performed in combination with step 709. For example, the suggested user action may be to perform a series of activities based at least in part upon biofeedback therapy, which will need communicating the acquired user's physiological parameters. In the case of a positive determination at step 712, the analyzing device further determines a system action (step 716), which can include one or a combination of actions to block or overtake the user's vehicle control elements 802, such as ignition 804, brakes 806, or other 808 (see FIG. 8), and at step 720 performs the system action by communicating it to vehicle controller 812. We must note that the described paths are not mutually exclusive, and that each of the steps 718 and 720 may or may not be implemented, depending on the embodiment. For example, an implementation may select to communicate user action only, or communicate user action and system action, or communicate system action and perform system action, or perform system action only, etc.

In some embodiments, in addition to determining the driving risk score based at least in part upon the user's stress indicators prior to a driving session, the analyzing device may add to its analysis data indicative of the driver being under stress in real time during a driving session. As an example, the smart ring or other capable devices may collect data on the user's physiological and behavioral parameters. The same or a different machine learning model would correlate this additional data with the saved driving data, and/or driving data of that session, and adjust the level of driving risk exposure in real time. The model may also correlate the real-time stress data with driver compliance with the suggested remediating action. The analyzing device may then determine a new remediating user or system action. In the case of the latter, the system may interfere or overtake vehicle operation, thus preventing the user from further driving.

For instance, the smart ring system might assess the ring user's driving fitness prior to a driving session and determine a driving risk score close to a threshold score. The system may suggest to the user to rest or carry out any other suitable stress coping technique to remediate the driving risk exposure. The driver might ignore this suggestion, and initiate a driving session. After a period of time, the driver's stress levels might increase. The ML model may process the driver's physiological and behavioral parameters, as well as real time driving data, and determine a driving risk score at or above a threshold score. In this scenario, the driver may be prevented from further driving by either stopping and parking the vehicle in a safe location, or switching the vehicle into autonomous mode.

In some embodiments, any of the suggested communication systems may communicate the acquired stress data, the determined driving risk score, the suggested remediation, and whether any actions were taken by the user, to the user's insurance provider (e.g., vehicle or health insurance provider). Such data can be used for real-time insurance adjustment, in a gamified environment of extrinsic rewards and motivators, or used in conjunction with other means of enforcing compliance with suggested remediating actions.

VIII. Vehicle Control Elements and Vehicle Monitor Components

Figure 8:
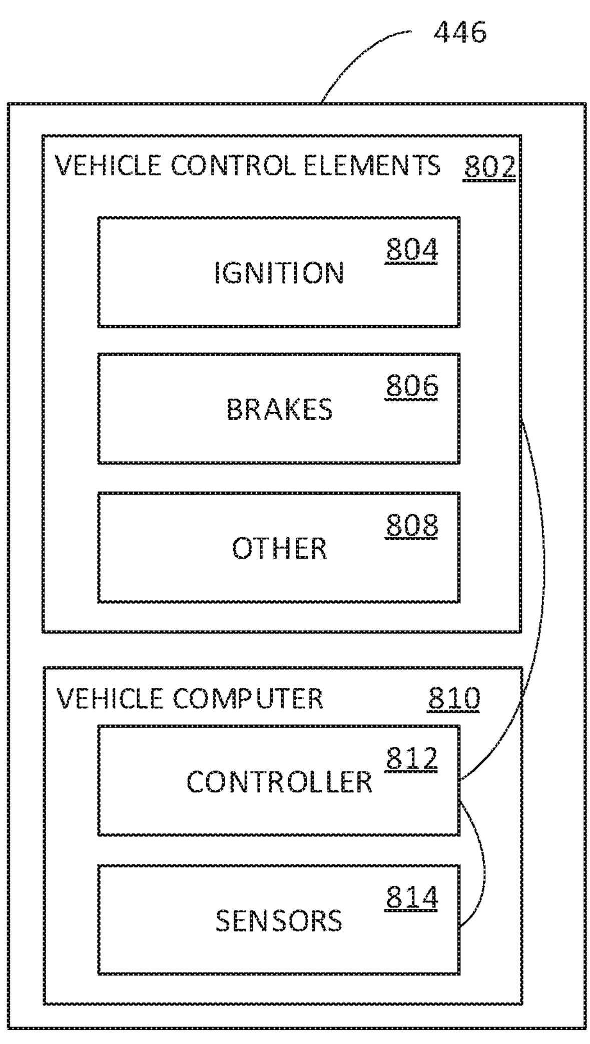
FIG. 8 shows example vehicle control elements and vehicle monitor components.

FIG. 8 shows elements of the vehicle 446 or 108, which may be in communication with the smart ring 101 or 405 and its components. Specifically, at a high level the vehicle 446 may include a set of vehicle control elements 802, which are controlled to operate the vehicle 446. The vehicle 446 may include the vehicle computer 810, which is a built-in computer system for the vehicle 446. The vehicle computer 810 may control a display (not shown) integrated into the dash or console of the vehicle 446 (e.g., to display speed, RPM, miles-per-gallon, a navigation interface, an entertainment interface, etc.) and may be referred to as a built-in vehicle computer, a carputer, an integrated vehicle computer, etc.

Vehicle control elements 802 may be in communication with other smart ring system (e.g., via vehicle controller 812), components to communicate or implement a remediating action in accordance with various embodiments disclosed therein.

The vehicle control elements may include ignition 804, brakes 806, and other components 808. As discussed below, the controller 812 may communicate with any one of the components 804-808 to prevent vehicle operation or overtake vehicle operation and resume it in autonomous mode as part of a remediation action after predicting a high driver risk exposure level or risk score. In an embodiment, vehicle sensors 814 may provide driving training data for the ML model training module **452*a***.

The vehicle computer 810 may include a controller 812 and sensors 814. While not shown, the controller 812 may include a memory and a processor, and the vehicle computer 810 may include a communication interface. The controller 812 may communicate with the vehicle control elements 802, implementing system actions of step 716. The controller 812 may also coordinate data generation and output from the sensors 814. The sensors 814 may be configured to collect data to enable tracking of the behavior of the vehicle 446 (e.g., braking, accelerating/decelerating, swerving, proximity to other vehicles, adherence to lane markers and other road markers, adherence to speed limits, etc.). The sensors 814 may include a speedometer; one or more accelerometers; one or more cameras, image sensors, laser sensors, RADAR sensors, or infrared sensors directed to the road surface, to potential obstacles on the road, or to the driver (e.g., for autonomous or semi-autonomous driving); a dedicated GPS receiver (not shown) disposed in the vehicle (e.g., in the interior, such as in the cabin, trunk, or engine compartment, or on the exterior of the vehicle); a compass; etc.

IX. Examples of Other Considerations

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

The described functions may be implemented, in whole or in part, by the devices, circuits, or routines of the system 100 shown in FIG. 1. Each of the described methods may be embodied by a set of circuits that are permanently or semi-permanently configured (e.g., an ASIC or FPGA) to perform logical functions of the respective method or that are at least temporarily configured (e.g., one or more processors and a set instructions or routines, representing the logical functions, saved to a memory) to perform the logical functions of the respective method.

While the present disclosure has been described with reference to specific examples, which are intended to be illustrative only and not to be limiting of the present disclosure, it will be apparent to those of ordinary skill in the art that changes, additions or deletions may be made to the disclosed embodiments without departing from the spirit and scope of the present disclosure.

Throughout this specification, plural instances may implement components, operations, or structures described as a single instance. Although individual operations of one or more methods are illustrated and described as separate operations, one or more of the individual operations may be performed concurrently in certain embodiments.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. Generally speaking, when a system or technique is described as including "a" part or "a" step, the system or technique should be read to include one or at least one part or step. Said another way, for example, a system described as including a blue widget may include multiple blue widgets in some implementations (unless the description makes clear that the system includes only one blue widget).

X. Examples of Terms and Phrases

Throughout this specification, some of the following terms and phrases are used.

Bus according to some embodiments: Generally speaking, a bus is a communication system that transfers information between components inside a computer system, or between computer systems. A processor or a particular system (e.g., the processor 454 of the server 450) or subsystem may communicate with other components of the system or subsystem (e.g., the components 452 and 456) via one or more communication links. When communicating with components in a shared housing, for example, the processor may be communicatively connected to components by a system bus. Unless stated otherwise, as used herein the phrase "system bus" and the term "bus" refer to: a data bus (for carrying data), an address bus (for determining where the data should be sent), a control bus (for determining the operation to execute), or some combination thereof. Depending on the context, "system bus" or "bus" may refer to any of several types of bus structures including a memory bus or memory controller, a peripheral bus, or a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Communication Interface according to some embodiments: Some of the described devices or systems include a "communication interface" (sometimes referred to as a "network interface"). A communication interface enables the system to send information to other systems and to receive information from other systems, and may include circuitry for wired or wireless communication.

Each described communication interface or communications unit (e.g., communications unit 160) may enable the device of which it is a part to connect to components or to other computing systems or servers via any suitable network, such as a personal area network (PAN), a local area network (LAN), or a wide area network (WAN). In particular, the communication unit 160 may include circuitry for wirelessly connecting the smart ring 101 to the user device 104 or the network 105 in accordance with protocols and standards for NFC (operating in the 13.56 MHz band), RFID (operating in frequency bands of 125-134 kHz, 13.56 MHz, or 856 MHz to 960 MHz), Bluetooth (operating in a band of 2.4 to 2.485 GHz), Wi-Fi Direct (operating in a band of 2.4 GHz or 5 GHz), or any other suitable communications protocol or standard that enables wireless communication.

Communication Link according to some embodiments: A "communication link" or "link" is a pathway or medium connecting two or more nodes. A link between two end-nodes may include one or more sublinks coupled together via one or more intermediary nodes. A link may be a physical link or a logical link. A physical link is the interface or medium(s) over which information is transferred, and may be wired or wireless in nature. Examples of physicals links may include a cable with a conductor for transmission of electrical energy, a fiber optic connection for transmission of light, or a wireless electromagnetic signal that carries information via changes made to one or more properties of an electromagnetic wave(s).

A logical link between two or more nodes represents an abstraction of the underlying physical links or intermediary nodes connecting the two or more nodes. For example, two or more nodes may be logically coupled via a logical link. The logical link may be established via any combination of physical links and intermediary nodes (e.g., routers, switches, or other networking equipment).

A link is sometimes referred to as a "communication channel." In a wireless communication system, the term "communication channel" (or just "channel") generally refers to a particular frequency or frequency band. A carrier signal (or carrier wave) may be transmitted at the particular frequency or within the particular frequency band of the channel. In some instances, multiple signals may be transmitted over a single band/channel. For example, signals may sometimes be simultaneously transmitted over a single band/channel via different sub-bands or sub-channels. As another example, signals may sometimes be transmitted via the same band by allocating time slots over which respective transmitters and receivers use the band in question.

Machine Learning according to some embodiments: Generally speaking, machine-learning is a method of data analysis that automates analytical model building. Specifically, machine-learning generally refers to the algorithms and models that computer systems use to effectively perform a specific task without using explicit instructions, relying on patterns and inference instead. Machine-learning algorithms learn through a process called induction or inductive learning. Induction is a reasoning process that makes generalizations (a model) from specific information (training data).

Generalization is needed because the model that is prepared by a machine-learning algorithm needs to make predictions or decisions based at least in part upon specific data instances that were not seen during training. Note, a model may suffer from over-learning or under-learning.

Over-learning occurs when a model learns the training data too closely and does not generalize. The result is poor performance on data other than the training dataset. This is also called over-fitting.

Under-learning occurs when a model has not learned enough structure from the training data because the learning process was terminated early. The result is good generalization but poor performance on all data, including the training dataset. This is also called under-fitting.

Memory and Computer-Readable Media according to some embodiments: Generally speaking, as used herein the phrase "memory" or "memory device" refers to a system or device (e.g., the memory unit 144) including computer-readable media ("CRM"). "CRM" refers to a medium or media accessible by the relevant computing system for placing, keeping, or retrieving information (e.g., data, computer-readable instructions, program modules, applications, routines, etc.). Note, "CRM" refers to media that is non-transitory in nature, and does not refer to disembodied transitory signals, such as radio waves.

The CRM may be implemented in any technology, device, or group of devices included in the relevant computing system or in communication with the relevant computing system. The CRM may include volatile or nonvolatile media, and removable or non-removable media. The CRM may include, but is not limited to, RAM, ROM, EEPROM, flash memory, or other memory technology, CD-ROM, digital versatile disks (DVD) or other optical disk storage, magnetic cassettes, magnetic tape, magnetic disk storage or other magnetic storage devices, or any other medium which can be used to store information, and which can be accessed by the computing system. The CRM may be communicatively coupled to a system bus, enabling communication between the CRM and other systems or components coupled to the system bus. In some implementations the CRM may be coupled to the system bus via a memory interface (e.g., a memory controller). A memory interface is circuitry that manages the flow of data between the CRM and the system bus.

Network according to some embodiments: As used herein and unless otherwise specified, when used in the context of system(s) or device(s) that communicate information or data, the term "network" (e.g., the networks 105 and 440) refers to a collection of nodes (e.g., devices or systems capable of sending, receiving or forwarding information) and links which are connected to enable telecommunication between the nodes.

Each of the described networks may include dedicated routers responsible for directing traffic between nodes, and, optionally, dedicated devices responsible for configuring and managing the network. Some or all of the nodes may be also adapted to function as routers in order to direct traffic sent between other network devices. Network devices may be inter-connected in a wired or wireless manner, and network devices may have different routing and transfer capabilities. For example, dedicated routers may be capable of high volume transmissions while some nodes may be capable of sending and receiving relatively little traffic over the same period of time. Additionally, the connections between nodes on a network may have different throughput capabilities and different attenuation characteristics. A fiberoptic cable, for example, may be capable of providing a bandwidth several orders of magnitude higher than a wireless link because of the difference in the inherent physical limitations of the medium. If desired, each described network may include networks or sub-networks, such as a local area network (LAN) or a wide area network (WAN).

Node according to some embodiments: Generally speaking, the term "node" refers to a connection point, redistribution point, or a communication endpoint. A node may be any device or system (e.g., a computer system) capable of sending, receiving or forwarding information. For example, end-devices or end-systems that originate or ultimately receive a message are nodes. Intermediary devices that receive and forward the message (e.g., between two end-devices) are also generally considered to be "nodes."

Processor according to some embodiments: The various operations of example methods described herein may be performed, at least partially, by one or more processors (e.g., the one or more processors in the processor unit 142). Generally speaking, the terms "processor" and "microprocessor" are used interchangeably, each referring to a computer processor configured to fetch and execute instructions stored to memory. By executing these instructions, the processor(s) can carry out various operations or functions defined by the instructions. The processor(s) may be temporarily configured (e.g., by instructions or software) or permanently configured to perform the relevant operations or functions (e.g., a processor for an Application Specific Integrated Circuit, or ASIC), depending on the particular embodiment. A processor may be part of a chipset, which may also include, for example, a memory controller or an I/O controller. A chipset is a collection of electronic components in an integrated circuit that is typically configured to provide I/O and memory management functions as well as a plurality of general purpose or special purpose registers, timers, etc. Generally speaking, one or more of the described processors may be communicatively coupled to other components (such as memory devices and I/O devices) via a system bus.

The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Although specific embodiments of the present disclosure have been described, it will be understood by those of skill in the art that there are other embodiments that are equivalent to the described embodiments. Accordingly, it is to be understood that the present disclosure is not to be limited by the specific illustrated embodiments.

What is claimed:

1. A method for predicting driving risk exposure based at least in part upon observed stress patterns, the method comprising:

receiving a machine learning (ML) model that is trained to determine a correlation between a stress pattern and a driving pattern using a set of first data and a set of second data, wherein:

the set of first data is indicative of the stress pattern and is collected via a stress monitoring device; and the set of second data is indicative of the driving pattern and is collected via one or more sensors disposed on or within a vehicle;

detecting a first cortisol level of a user from a smart ring worn by the user prior to a driving session;

analyzing, via the ML model, the first cortisol level of the user prior to the driving session, wherein the analyzing includes:

determining whether the first cortisol level of the user represents a level of correspondence between a particular stress pattern of the user and the stress pattern correlated with the driving pattern; and predicting, based upon the level of correspondence between the particular stress pattern of the user and the stress pattern correlated with the driving pattern, a level of driving risk for the user prior to the driving session;

generating a first notification prior to the driving session, wherein the first notification provides the user with a remediating action comprising a first stress coping strategy, based on the level of driving risk for the user as predicted prior to the driving session;

transmitting the first notification to the user;
after transmitting the first notification:
using one or more sensors to track a behavior of the user during the driving session, wherein initiation of the driving session is detected by one or more of speed, acceleration, braking, or swerving of the vehicle;
detecting a second cortisol level of the user from the smart ring worn by the user during the driving session;
performing a correlation of real-time stress data to a driving compliance of the user with the remediating action, wherein the real-time stress data is based on the second cortisol level of the user and the behavior of the user during the driving session;
based on the correlation, determining a new remediating action;
generating a second notification, wherein the second notification provides the user with:
an alert to display to the user (i) the level of driving risk for the user during the driving session, and (ii) the new remediating action; and
transmitting the second notification to the user.

2. The method of claim 1, wherein the set of first data comprises physiological data or biochemical data collected via a physiological sensor or a biochemical sensor.

3. The method of claim 1, wherein the set of second data comprises gestural data or hand grip pressure data collected via a gesticulation sensor or a pressure sensor on a steering wheel.

4. The method of claim 1, wherein the set of second data comprises the set of second data collected via a sensor disposed within the smart ring.

5. The method of claim 1, wherein the set of second data comprises the set of second data collected via a vehicle computer or a dedicated electronic driving tracker device.

6. The method of claim 1, wherein providing the second notification further comprises:
providing the second notification at the smart ring or at an in-dash display of the vehicle.

7. The method of claim 1, further comprising:
analyzing the first cortisol level of the user prior to the driving session, comprising:
comparing a first level of driving risk to a known threshold to determine whether the first level of driving risk exceeds the known threshold, wherein the first level of driving risk is based on the first cortisol level;
responding to determining that the first level of driving risk exceeds the known threshold by generating a system action that prevents the user from operating the vehicle; and
preventing the user from starting the vehicle.

8. The method of claim 1, further comprising:
analyzing the second cortisol level of the user during the driving session, comprising:
comparing a second level of driving risk to a known threshold to determine whether the second level of driving risk exceeds the known threshold;
responding to determining that the second level of driving risk exceeds the known threshold by generating a system action that prevents the user from operating the vehicle; and
overtaking control of the vehicle while the vehicle is in operation by the user.

9. The method of claim 1, further comprising:
utilizing the first cortisol level of the user prior to the driving session representing the particular stress pattern to further train the ML model.

10. A system for acquiring data indicative of stress patterns, and utilizing the data to predict driving risk exposure, comprising:
a server communicatively coupled to a smart ring, the server configured to:
receive a machine learning (ML) model that is trained to determine a correlation between a stress pattern and a driving pattern using a set of first data and a set of second data, wherein:
the set of first data is indicative of the stress pattern collected via a stress monitoring device; and
the set of second data is indicative of the driving pattern collected via one or more sensors disposed on or within a vehicle;
detect a first cortisol level of a user from the smart ring worn by the user prior to a driving session;
analyze, via the ML model, the first cortisol level of the user prior to the driving session, wherein the server is configured to:
determine whether the first cortisol level of the user represents a level of correspondence between a particular stress pattern of the user and the stress pattern correlated with the driving pattern;
predict, based upon the level of correspondence between the particular stress pattern of the user and the stress pattern correlated with the driving pattern, a level of driving risk for the user prior to the driving session; and
generate a first notification prior to the driving session, wherein the first notification provides the user with a remediating action comprising a first stress coping strategy, based on the level of driving risk for the user as predicted prior to the driving session;
transmit the first notification to the user;
after transmitting the first notification:
detect a second cortisol level of the user during the driving session from the smart ring worn by the user;
perform a correlation of real-time stress data to a driving compliance of the user with the remediating action, wherein the real-time stress data is based on the second cortisol level of the user and a behavior of the user during the driving session;
based on the correlation, determine a new remediating action;
generate a second notification, wherein the second notification provides the user with:
an alert to display to the user (i) the level of driving risk for the user during the driving session, and (ii) the new remediating action; and
transmit the second notification to the user.

11. The system of claim 10, wherein the set of first data includes physiological or biochemical data collected by physiological or a biochemical sensor.

12. The system of claim 10, wherein the set of first data includes behavioral data collected by a behavioral sensor.

13. The system of claim 10, wherein the smart ring has an inner diameter within a range between 13 mm and 23 mm.

14. The system of claim 10, wherein the server is configured to generate the second notification to alert the user of the level of driving risk by one or more of: providing the second notification to the smart ring, a vehicle computer, or a mobile device in communication with the server.

15. The system of claim 10, wherein the set of first data includes a stress pattern data for a user other than the user associated with the smart ring.

16. The system of claim 10, wherein the set of second data includes a driving pattern for a user other than the user associated with the smart ring.

17. A server for predicting driving risk exposure based at least in part upon acquired stress patterns, the server comprising:

a communication interface;

one or more processors coupled to the communication interface; and a memory coupled to the one or more processors and storing computer readable instructions that, when implemented, cause the one or more processors to:

receive a machine learning (ML) model that is trained to determine a correlation between a stress pattern and a driving pattern using a set of first data and a set of second data, wherein:

the set of first data is indicative of the stress pattern collected via a stress monitoring devices; and the set of second data is indicative of the driving pattern collected via one or more sensors disposed on or within a vehicle;

detect a first cortisol level of a user from a smart ring worn by the user prior to a driving session;

analyze, via the ML model, the first cortisol level of the user prior to the driving session, wherein the processor is configured to:

determine whether the first cortisol level of the user represents a level of correspondence between a particular stress pattern of the user and the stress pattern correlated with the driving pattern; and predict, based upon the level of correspondence between the particular stress pattern of the user and the stress pattern correlated with the driving pattern, a level of driving risk for the user prior to the driving session;

generate a first notification prior to the driving session, wherein the first notification provides the user with a remediating action comprising a first stress coping strategy, based on the level of driving risk for the user as predicted prior to the driving session;

transmit the first notification to the user;

after transmitting the first notification:

detect a second cortisol level of the user during the driving session from the smart ring worn by the user;

perform a correlation of real-time stress data to a driving compliance of the user with the remediating action, wherein the real-time stress data is based on the second cortisol level of the user and a behavior of the user during the driving session;

based on the correlation, determine a new remediating action;

generate a second notification, wherein the second notification provides the user with:

an alert to display to the user (i) the level of driving risk for the user during the driving session, and (ii) the new remediating action; and transmit the second notification to the user.

18. The server of claim 17, wherein to cause the one or more processors to generate the second notification to alert the user of the level of driving risk comprises: to cause the one or more processors to transmit the second notification to any of: the smart ring, a vehicle computer, or a mobile device.

19. The server of claim 17, wherein the level of driving risk is a binary or ternary parameter.

20. The server of claim 17, wherein the computer readable instructions, when implemented, further cause the one or more processors to:

compare a first level of driving risk to a known threshold to determine whether the first level of driving risk exceeds the known threshold, wherein the first level of driving risk is based on the first cortisol level; and when the first level of driving risk exceeds the known threshold, generate a system action and transmit the system action to a vehicle computer for the vehicle to cause the vehicle computer to prevent the user from operating the vehicle.

* * * * *